(12) United States Patent
Drucker et al.

(10) Patent No.: US 9,070,227 B2
(45) Date of Patent: Jun. 30, 2015

(54) PARTICLE BASED VISUALIZATIONS OF ABSTRACT INFORMATION

(71) Applicant: Microsoft Corporation, Redmond, WA (US)

(72) Inventors: Steven M. Drucker, Bellevue, WA (US); Roland Fernandez, Woodinville, WA (US); Danyel Fisher, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/784,792

(22) Filed: Mar. 4, 2013

(65) Prior Publication Data

US 2014/0247268 A1  Sep. 4, 2014

(51) Int. Cl.
*G06T 11/20* (2006.01)

(52) U.S. Cl.
CPC .................................. *G06T 11/206* (2013.01)

(58) Field of Classification Search
CPC ....................................................... G06T 11/206
USPC ......................................... 345/440; 715/234
See application file for complete search history.

(56) References Cited

U.S. PATENT DOCUMENTS

| | | | |
|---|---|---|---|
| 5,894,311 A * | 4/1999 | Jackson | 345/440 |
| 5,960,432 A | 9/1999 | Werner | |
| 6,990,238 B1 | 1/2006 | Saffer et al. | |
| 2005/0275655 A1 * | 12/2005 | Stolze et al. | 345/440 |
| 2006/0082577 A1 | 4/2006 | Carter | |
| 2006/0200358 A1 | 9/2006 | Ohnemus et al. | |
| 2008/0165186 A1 | 7/2008 | Lin | |
| 2009/0013281 A1 | 1/2009 | Helfman et al. | |
| 2009/0021517 A1 | 1/2009 | Foslien | |
| 2010/0005008 A1 | 1/2010 | Duncker et al. | |

(Continued)

FOREIGN PATENT DOCUMENTS

| | | |
|---|---|---|
| WO | 2014137856 A2 | 9/2014 |
| WO | 2014137948 | 9/2014 |

OTHER PUBLICATIONS

Daniel A. Keim, "Designing Pixel-Oriented Visualization Techniques: Theory and Applications", IEEE Transactions on Visualization and Computer Graphics, vol. 6, No. 1, Jan.-Mar. 2000, pp. 59-78.

(Continued)

*Primary Examiner* — Phi Hoang
(74) *Attorney, Agent, or Firm* — Judy Yee; Steve Wight; Micky Minhas

(57) ABSTRACT

Multivariate data that includes data records may be obtained, each of the data records represented as data values of data attribute variables. A cardinality of the data records is substantially large. A display layout template representing a collectivized visualization of dataset points is obtained, the collectivized visualization logically associated with a set of the data attribute variables, from a perspective of a user viewer. An individualized particulate display representation for each of the data records is determined, based on a portion of the data values associated with each respective data record. The individualized particulate display representation includes a discrete, individually selectable particulate shape and a display location relative to geometric bounds logically associated with the template. Display of the individualized particulate display representations is initiated in accordance with the template.

20 Claims, 24 Drawing Sheets

(56) References Cited

U.S. PATENT DOCUMENTS

| | | | |
|---|---|---|---|
| 2010/0201692 | A1 | 8/2010 | Niles et al. |
| 2010/0214299 | A1* | 8/2010 | Robertson et al. ............ 345/440 |
| 2010/0277507 | A1 | 11/2010 | Allyn et al. |
| 2011/0187711 | A1 | 8/2011 | Giovinazzi et al. |
| 2011/0261049 | A1 | 10/2011 | Cardno et al. |
| 2012/0053986 | A1 | 3/2012 | Cardno et al. |
| 2012/0151389 | A1 | 6/2012 | Bishop et al. |
| 2012/0218254 | A1 | 8/2012 | Abeln |
| 2012/0283959 | A1* | 11/2012 | Ruzic et al. ...................... 702/23 |
| 2012/0313949 | A1* | 12/2012 | Rope et al. .................... 345/440 |
| 2014/0173411 | A1* | 6/2014 | Sekharan, Satishkumar 715/234 |
| 2014/0247271 | A1 | 9/2014 | Fernandez et al. |

OTHER PUBLICATIONS

Keim, et al., "Pixel Bar Charts: A Visualization Technique for Very Large Multi-Attribute Data Sets", Retrieved Feb. 25, 2013 at <<http://kops.ub.uni-konstanz.de/bitstream/handle/urn-:nbn:de:bsz:352-opus-69861/pbc01.pdf?sequence=1>>, Information Visualization, vol. 1, Issue 1, Mar. 2002, pp. 20-34.

Yang, et al., "Analysis Guided Visual Exploration of Multivariate Data", Retrieved Feb. 21, 2013 at <<http://ieeexplore.ieee.org/stamp/stamp.jsp?tp=&arnumber=4389000>>, In Proceedings of the 2007 IEEE Symposium on Visual Analytics Science and Technology (VAST '07), 2007, pp. 83-90.

Heer, et al., "Interactive Dynamics for Visual Analysis," Retrieved Feb. 21, 2013 at <<http://delivery.acm.org/10.1145/2150000/2146416/p30-heer.pdf>>, ACM Queue, vol. 10 No. 2, Feb. 2012, 26 pages.

Miller, et al., "EVEVis: A Multi-Scale Visualization System for Dense Evolutionary Data," Retrieved Feb. 21, 2013 at <<http://vis.cs.ucdavis.edu/papers/evevis-evolutionary-vis.pdf>>, In Proceedings of 2011 IEEE Symposium on Biological Data Visualization (BioVis), Oct. 23, 2011, pp. 143-150.

North, Peter, "Visualize Your Data and Speed up Your Site with Dynamic Chart Libraries," Retrieved Feb. 21, 2013 at <<http://designfestival.com/visualize-your-data-and-speed-up-your-site-with-dynamic-chart-libraries/>>, Design Festival, Mar. 12, 2012, 12 pages.

Venkatachalam, R., "Playing with Data—Part 2. Data Visualization: Heat Maps," Retrieved Feb. 21, 2013 at <<http://icreate.in/blog/compliance/playing-with-data-part-2-data-visualization-heat-maps>>, iCreate Blog, iCreate Software, Jun. 27, 2012, 6 pages.

"Inbetweening," Retrieved Feb. 26, 2013 at <<http://en.wikipedia.org/wiki/Inbetweening>>, Wikipedia, 3 pages.

"Faceted Browser—SIMILE," Retrieved Feb. 19, 2013 at <<http://simile.mit.edu/wiki/Faceted_Browser>>, MIT, Nov. 3, 2006, 2 pages.

"Faceted search," Retrieved Feb. 19, 2013 at <<http://en.wikipedia.org/wiki/Faceted_search>>, Wikipedia, 3 pages.

"International Search Report & Written Opinion for PCT Patent Application No. PCT/US2014/019765", Mailed Date: Sep. 16, 2014, 10 Pages.

Erlebacher, et al., "Flow Textures: High Resolution Flow Visualization", Retrieved at <<http://people.sc.fsu.edu/~gerlebacher/home/publications/erle_job_weis_handbook_2003.pdf>> In Handbook of Visualization, Apr. 8, 2003, pp. 24.

"International Search Report & Written Opinion for PCT Application No. PCT/US2014/020045", Mailed Date: May 15, 2014, Filed Date: Mar. 3, 2014, 13 Pages.

"Population Pyramid", Published on: Nov. 12, 2012, 10 pages, Available at: http://bl.ocks.org/mbostock/4062085.

"General-Purpose Computing on Graphics Processing Units", Published on: Feb. 12, 2013, 12 pages, Available at: http://en.wikipedia.org/w/index.php?title=General-purpose_computing_on_graphics_processing_units&oldid=537797813.

"Elevating JavaScript Performance Through GPU Power", Published on: Oct. 26, 2010, 6 pages, Available at: https://groups.google.com/forum/#!topic/gpu_newbies/dUSIY5XHg3o.

Klockner, Andreas, "PyCUDA: Even Simpler GPU Programming with Python", Published on: Sep. 22, 2010, 65 pages, Available at: http://mathema.tician.de/dl/main.pdf.

PCT Application No. PCT/US2014/020045, PCT Chapter II Demand (including Claims amended under Article 34 PCT and Letter Accompanying the Amendments under Article 34 PCT), dated Sep. 12, 2014, 23 pages.

Soulié, Juan, "C++Language Tutorial," retrieved May 16, 2015 at <<http://www.cplusplus.com/files/tutorial.pdf>>, cplusplus.com, last revision Jun. 2007, 144 pages.

Office Action mailed May 8, 2015 for U.S. Appl. No. 13/919,007, inventors Fernandez et al., entitled "Data Visualization," filed Jun. 17, 2014, 19 pages.

\* cited by examiner

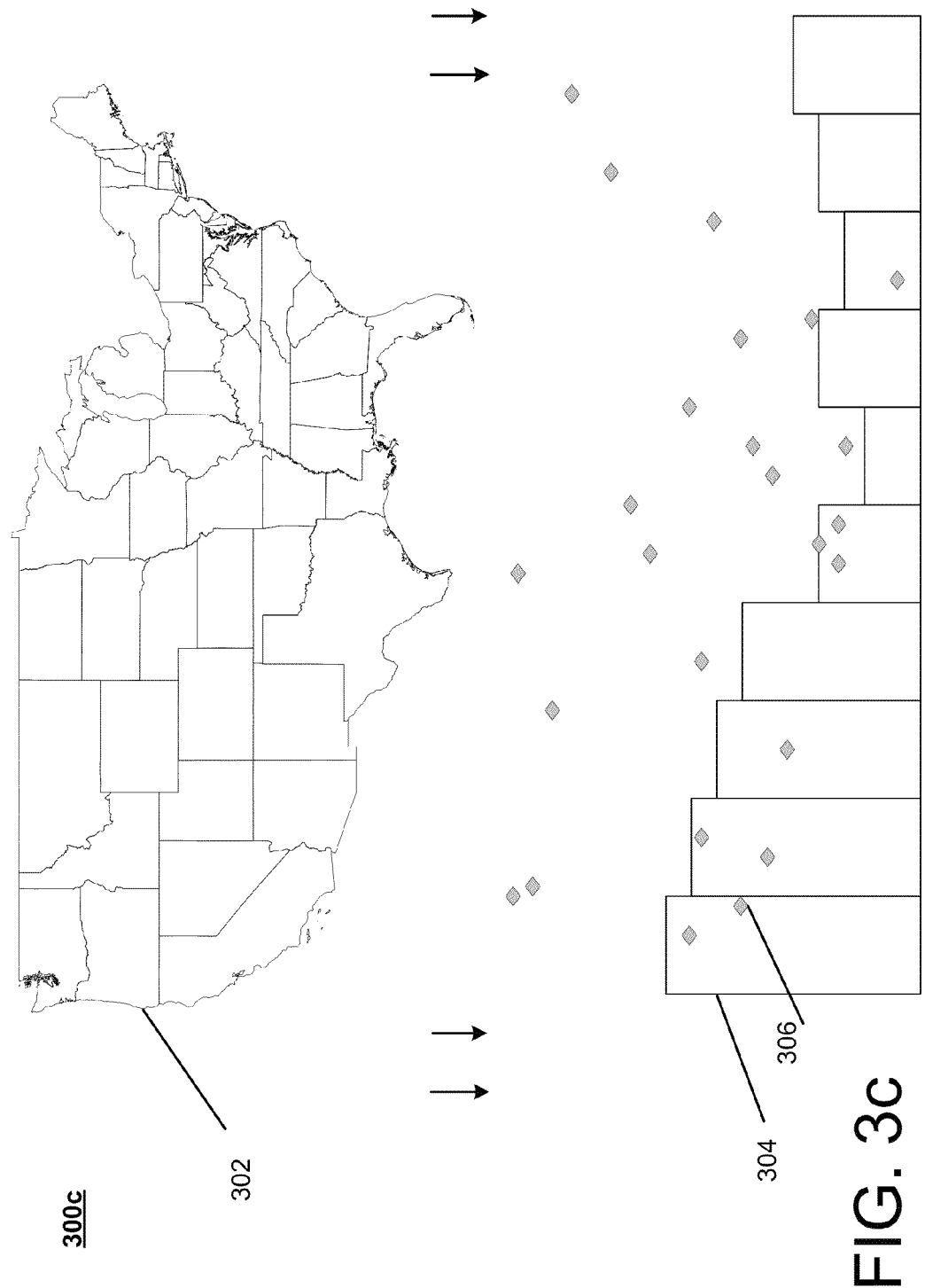

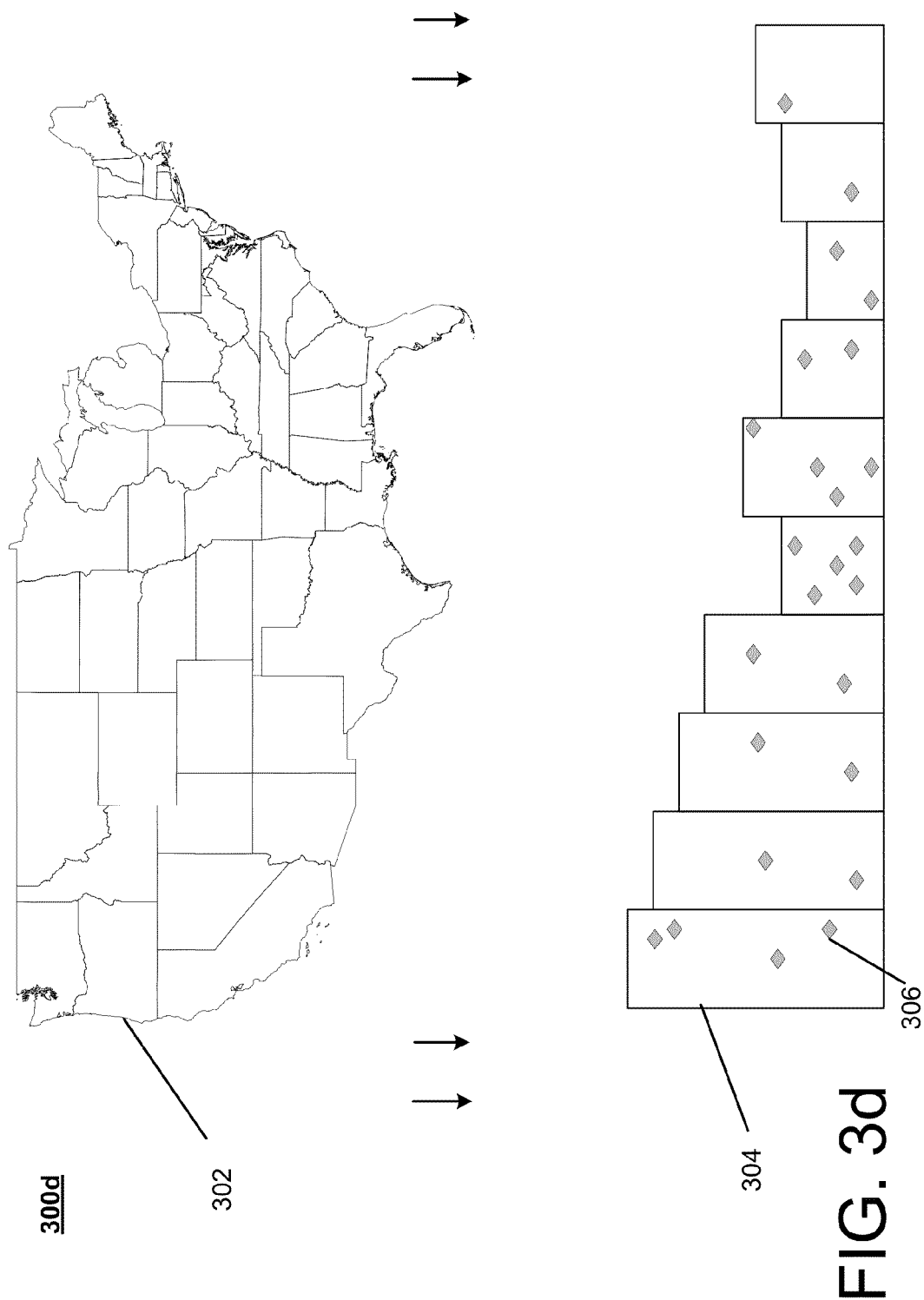

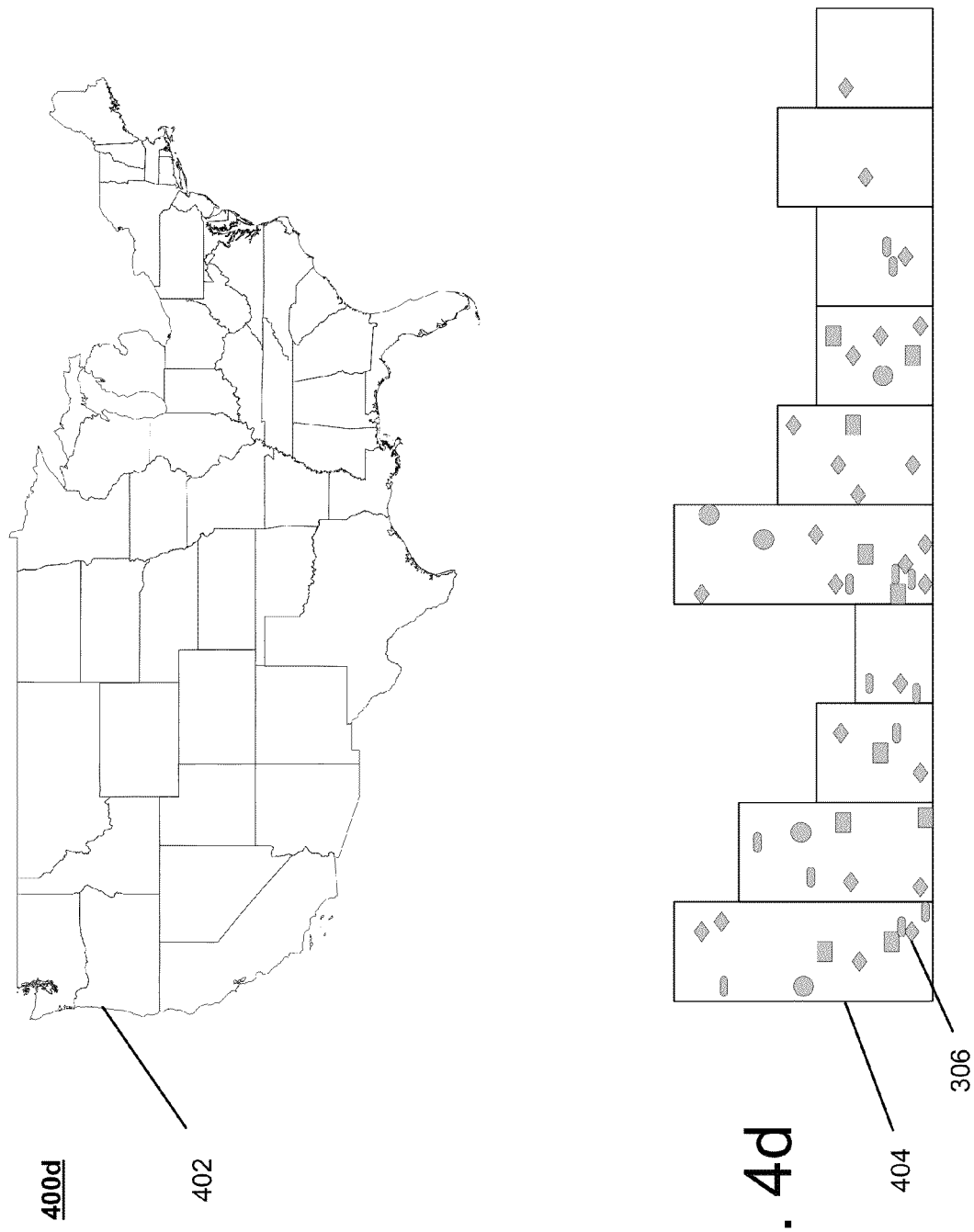

(8A)
↓

| 812 | The first display layout template includes one or more of a template associated with a layout of a bar chart outline for displayed enclosure of the first individualized particulate display representations, a template associated with a layout of a stacked bar chart outline for displayed enclosure of the first individualized particulate display representations, a template associated with a layout of a geographical map outline for displayed enclosure of the first individualized particulate display representations, a template associated with a histogram layout for display of the first individualized particulate display representations, a template associated with a scatter plot layout for display of the first individualized particulate display representations, a template associated with a layout of a pie chart outline for displayed enclosure of the first individualized particulate display representations, or a template associated with a layout of a geometric shape outline for displayed enclosure of the first individualized particulate display representations |

800b (8B)
↓

| 814 | Determine one or more display attributes associated with the first individualized particulate display representation, based on one or more of a selection of at least one of the display attributes obtained from a user, a determination at least one of the display attributes based on a function of one or more of the data attribute variables for the respective each data record, a selection of the respective each data record obtained from a user, or a selection of the respective each data record based on a change in value of one or more of the data attribute variables for the respective each data record |

FIG. 8b

PARTICLE BASED VISUALIZATIONS OF ABSTRACT INFORMATION

BACKGROUND

Display of visualizations of properties of very large datasets has been an area of interest for many years. For example, a user may wish to determine trends in voting habits, based on viewing a map of the United States that is somehow shaded (e.g., with shades of red or blue) or hatched to indicate polling results for various areas of the country. Datasets of records that include multiple attribute values (e.g., records representing people with attributes such as age, gender, ethnicity, eye color, hair color, education level, church membership, educational institutions, political voting habits, geographic location of residence, appraised value of home, etc.) may provide information of interest to many users. For example, many users may wish to determine the number of men who voted for a particular political candidate, versus the number of women who voted for the candidate, while focusing on which areas of the country had significant differences in such voting statistics from other areas of the country. For example, a further focus may involve adding ethnicity into the statistical parameters for such a determination. Many users (e.g., political candidates) may further wish to focus on more dense or less dense areas to select one or more individual citizens, to study the individuals themselves in more depth (e.g., to ask them to appear at campaign events).

SUMMARY

According to one general aspect, a system may include a particle based visualization engine. A dataset acquisition component may be configured to obtain a set of multivariate data that includes a data records. Each of the records may be represented as a plurality of data values of data attribute variables. A cardinality of the data records is substantially large. A template acquisition component may be configured to obtain a first display layout template representing a first collectivized visualization of dataset points. The first collectivized visualization may be logically associated with a set of the data attribute variables, from a perspective of a user viewer. A display representation determination component may be configured to determine a first individualized particulate display representation for each of the data records, based on at least a portion of the data values associated with each respective data record. The first individualized particulate display representation includes a discrete, individually selectable first particulate shape and a first display location relative to geometric bounds logically associated with the first display layout template. A display interface component may be configured to initiate a first display of the first individualized particulate display representations in accordance with the first display layout template. Further, an animated transition display interface component may be configured to initiate an animated transition display representing an animated transitional view of the first individualized particulate display representations in the first display, temporally transitioning to a second display of second individualized particulate display representations.

According to another aspect, a set of multivariate data that includes data records may be obtained. Each of the records may be represented as data values of data attribute variables, a cardinality of the data records being substantially large. A first display layout template representing a first collectivized visualization of dataset points may be obtained. The first collectivized visualization may be logically associated with a first set of the data attribute variables, from a perspective of a user viewer. A first individualized particulate display representation for each of the data records may be determined, based on at least a portion of the data values associated with each respective one of the data records. The first individualized particulate display representation may include a discrete, individually selectable first particulate shape and a first display location relative to geometric bounds that are logically associated with the first display layout template. A display of the first individualized particulate display representations may be initiated, in accordance with the first display layout template.

According to another aspect, a computer program product tangibly embodied on a computer-readable storage medium may include executable code that may cause at least one data processing apparatus to obtain a set of multivariate data that includes data records, each of the records represented as data values of data attribute variables. A cardinality of the data records is substantially large. Further, the data processing apparatus may obtain a first display layout template representing a first collectivized visualization of dataset points, the first collectivized visualization logically associated with a first set of the data attribute variables, from a perspective of a user viewer. Further, the data processing apparatus may determine a first individualized particulate display representation for each of the data records, based on at least a portion of the data values associated with each respective one of the data records. The first individualized particulate display representation may include a discrete, individually selectable first particulate shape and a first display location relative to geometric bounds that are logically associated with the first display layout template. Further, the data processing apparatus may initiate a display of the first individualized particulate display representations in accordance with the first display layout template.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 3a-3e illustrates an example geographical map template, bar chart template, and histogram template, with representations of filtered data records for animated transitioning from one display format to another.

FIGS. 4a-4e illustrates an example geographical map template and bar chart template, with representations of filtered data records for animated transitioning from one display format to another.

FIGS. 8a-8c are a flowchart illustrating example operations of the system of FIG. 1.

DETAILED DESCRIPTION

I. Introduction

Figure 1:
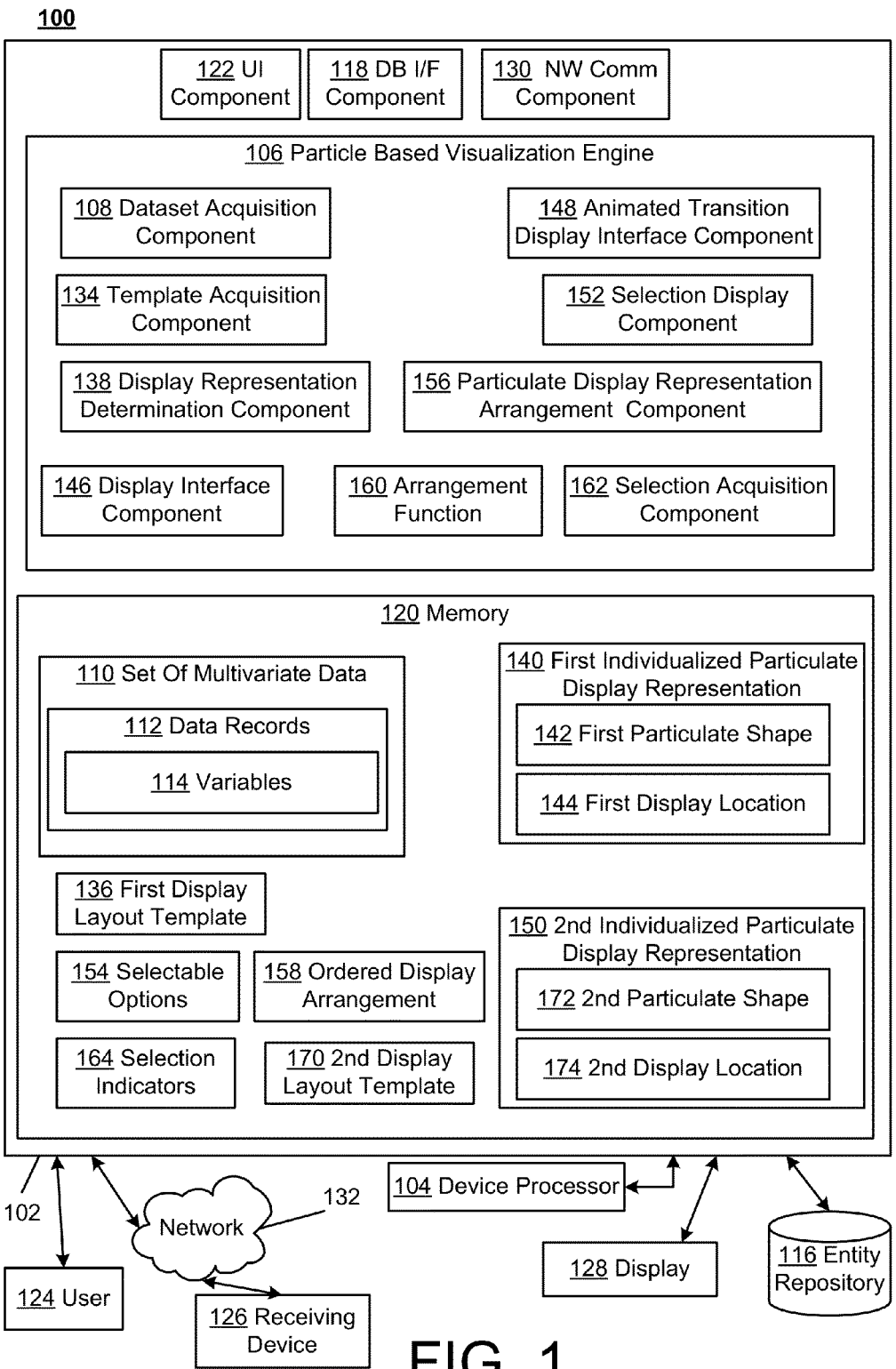
FIG. 1 is a block diagram illustrating of an example system for particle based animated visualizations.

Understanding complex relationships in multivariate data has been an area of research interest for many years. In accordance with example techniques discussed herein, visual attributes may be assigned to different variables for each observation, so that the human visual system may be able to detect patterns and relationships within the data. Many conventional visualizations systems aggregate individual observations into summaries of the data and display those summaries. However, example techniques discussed herein enable the display of substantially large datasets (e.g., with hundreds of thousands of individual points), showing individual points while at the same time, organizing their layout to illustrate overall qualities. In this way, both the "forest" and the "trees" aspects of a particular problem may be visibly discernible.

For example, individual points (e.g., each "point" representing a single record in the dataset) may be relaid out and their transitions may be animated to aid users in understanding how different views of the data may correspond with each other. In this context, an "animated display" may refer to a display of a collection of display elements that may change over time (or "temporally"). For example, the changes may occur with an appearance of the display elements substantially remaining (or disappearing) in-place within a display area, or the changes may occur with a visual representation of the display elements moving from one location to another within the display area. For example, a goal of a transition involving an appearance of moving display elements may involve avoiding a visual appearance of crossing of display elements during the movement, while preserving (at least) "higher than" and "lower than" relationships among the display elements, from one view to the next. For example, if a first display element is higher than a second element (e.g., higher on a latitudinal axis) in a first view, then it may be desired that the first display element may continue to appear higher than the second element in a moving transition, from a first state to a final state (e.g., a second view), and that the two elements will not appear to cross each other in display, during the transitional movement.

Some conventional pixel-oriented visualization techniques are discussed, for example, in Keim, Daniel A., "Designing Pixel-Oriented Visualization Techniques: Theory and Applications," *IEEE Transactions on Visualization and Computer Graphics*, Vol. 6, Issue 1, January 2000, pp. 59-78 and Keim et al., "Pixel bar charts: a visualization technique for very large multi-attribute data sets," *Information Visualization*, Vol. 1, Issue 1, March 2002, pp. 20-34. However, this work did not involve dynamic transitions between multiple views, and did not focus on example operations of selection, filtering, and relaying out.

Example techniques discussed herein may provide a visualization system using faceted browsing that may scale (at least) to hundreds of thousands of items (e.g., "substantially large" datasets). For example, arbitrary data tables may be loaded and results may be filtered using facets, and may be displayed using a variety of layouts. For example, multiple linked views may provide for associations between the same items in each view.

For example, arbitrary subsets may be generated by successively applying filtering operations. For example, the interface may be accessible via a plurality of device types, including portable devices such as tablets. For example, a system may be implemented via a browser interfacing with one or more graphical processing units (GPUs) that are colocated on a user device (e.g., to perform the graphical processing on the user device). For example, a web page that is based on Hypertext Markup Language 5 (HTML5) may be run to interface with the GPU(s). For example, the system may access a server to obtain the data, or the system may perform all processing on a single device (e.g., a mobile device).

For example, a browser may interact with one or more graphical processing units (GPUs) located locally on a user device, to process user requests, to generate the displayed representations, with all such graphical processing being performed in real time, local to the user device. For example, such graphical processing may be performed based on execution of JAVASCRIPT instructions, interacting with one or more device-local GPUs, to generate the example display representations as discussed herein, in real time (e.g., using very fast plotting operations). For example, a substantial portion of such graphical processing may be performed in parallel processing operations via such GPUs. For example, map "shaders" may be used via processing by the GPU(s), via code such as JAVASCRIPT code, or via combinations of processing by the GPU(s) and processing performed via JAVASCRIPT code executed, e.g., using a browser.

For example, the system may also be implemented using a plug-in (or add-on) to a browser, and may access a server to obtain the data, or the system may perform all processing on a single device (e.g., a mobile device).

Of course, many other techniques may be used for the graphical processing, without departing from the spirit of the discussion herein, as will be apparent to one skilled in the art of data processing.

For example, the datasets may include datasets from third party providers, or they may include personal datasets that are available only to a single user, or a select group of users. Further, the templates used for displays of selected data may include types such as histograms, bar charts, scatter plots, maps, and other statistical display types, or they may be custom templates, e.g., designed by the individual user, in accordance with personal preferences in display. For example, if a dataset includes latitude and longitude information associated with each data record, then a default template may be configured to provide a visualized representation of the data records as points in a scatter plot with latitude and longitude axes. In one aspect, while the templates may represent a shape, the visualization of the collective representations of the data records may provide a visual effect of the associated shape, without providing additional display elements, such as shape outlines. For example, the collective representations of a portion of the data records may provide a visual effect of a bar in a bar chart, without an additional display of an outline boundary of the bar (e.g., with hundreds of thousands of data records represented as granular "points" (or "sand particles") within the boundaries of the bar). For example, such data record granular "points" may be represented by multiple pixels.

Individual records may be displayed as "particulate" objects that are displayed collectively (e.g., rather than in "aggregated summary" format), as individual objects within the templates (e.g., summarizing templates), as individual records represented as individualized particulate representations (e.g., as particulate shapes, displayed in respective particulate locations within the display templates). Thus, it may be possible to view a collectivized display, and select a single record, based on selecting its corresponding particulate shape within the display template. Upon selection, it may be possible to view (or otherwise access) attribute values associated with the individual record, and it may be possible to further interact with the individual record (e.g., drag its information into an area for further processing).

For example, a user may request a particular view of a selected portion of the dataset (e.g., as points on a geographical map, or as granular points in a bar chart, or stacked bar chart). The user may wish to focus on particular attributes associated with the records, and may filter the currently displayed information to transition to a different display format (e.g., from the geographical map to a granular bar chart format). For example, the transition may be a substantially "in-place" transition (e.g., the displayed information remains in substantially the same display location, with other display effects changing), or it may be a transition involving a visualization effect of display elements temporally moving from one display location to another display location.

Further, the user may select an area of the current view (e.g., by dragging over an area to select that area, or by entering area bounding information into a displayed menu), and may request a transition of the information covered by the selection, to a different display format (e.g., from a geographical map, or bar chart, to a scatter plot format). The user may also select visual formatting such as various color preferences, flashing effects, movement (e.g., jitter, wobble), sizes and/or shapes of the "particulate" format for individual records, based on particular values of one or more attribute values associated with the records in the dataset. Additionally, visual attributes such as shape, image, and opacity may be used in such mappings. For example, if the dataset includes images (or other types of media) that are associated with respective individual data records (or with particular groups of the data records), then such images (or other media) may also be used in the displayed visualizations as discussed herein. For example, a user selection of a representation of a particular record may initiate a display (at least) of a thumbnail photo of an entity represented by the record. For example, a small, particulate graphical icon associated with the record may be displayed in the collective display of representations of data records. For example, an audio file (or other media file such as a video) associated with a particular data record may be played upon selection of that particular record in a collectivized display of sets of representations of the data records in the dataset, as discussed herein.

For example, if a user is viewing a "current" view of a collectivized display of a set of the representations of the data records, then the user may also be able to request a faceted view. For example, the user may select one or more data attributes, to request a new display based on separating the current view into multiple views based on the selected attribute(s).

Example techniques discussed herein may thus provide animated visualizations of large amounts of multivariate data. For example, each record may be visualized as an individual shape on the screen, and each record may be organized into different layouts. Further, dynamic transitions between multiple layouts of the data may be provided. Further, such example techniques may enable users to brush, link, focus, filter, recolor, re-layout, and resize individual elements based on interaction.

For example, the records may be "slotted" based on data values associated with data attributes that are included in the data record representations, which provide an ability to map the data records to templates such as bar charts, scatter plots, map views, etc.

For example, the individualized particulate representations of individual records, within a display template, may include an individualized shape, position, color, size or animation of a particular object.

For example, in displaying a transition from one format to another, an example technique may use "inbetweening," or "tweening," to generate intermediate frames between two images to provide an appearance representative of the first image evolving smoothly into the second image.

For example, the individualized particulate representations of individual records, within a display template may be sorted, based on one or more attribute values (e.g., by default, or based on one or more user selections), such that shapes within a layout may be arranged in an ordering, based on the value of an attribute (or on values of multiple attributes, based on a function of those attributes). For example, a user may wish to sort based visualized color attributes associated with respective data records, for example, within a current view's visualization. For example, a transition may involve a visualization representative of moving the individualized particulate representations associated with various colors (or ranges of "close" colors thereof) to a view where the records are visualized as sorted on the colors.

For example, in accordance with techniques discussed herein, a user may be able to data map all available visualization shape attributes (e.g., properties used for drawing each shape in a visualization) included in an example visualization system discussed herein. For example, in accordance with techniques discussed herein, a user may be able to animate all available visualization shape attributes included in an example visualization system discussed herein.

For example, data mapping options may include custom palettes (e.g., for color, size, opacity, etc). For example, gradients may be used for generating various ranges of visualization shape attributes (e.g., color gradients for selection of fine variations of colors, for example, in displaying a gradual transitioning from one color to another color, or for user selection of fine variations of colors). For example, a range of values may be mapped to a range of colors within a gradient.

Example techniques discussed herein may support data formatting rules (e.g., "make all negative profits red") that may include default selections, selections obtained from user input (e.g., implicitly or explicitly), and/or data formatting rules supplied by a user as code (e.g., scripts) or as text rules (e.g., Boolean rules).

Example techniques discussed herein may also support "gamma" functions (e.g., for skewing a mapping towards one end of a displayed palette or the other end).

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for particle based animated visualizations. As shown in FIG. 1, a system 100 may include a device 102 that includes at least one processor 104. The device 102 may include a particle based visualization engine 106 that may include a dataset acquisition component 108 that may be configured to obtain a set of multivariate data 110 that includes a first plurality of data records 112, each of the records represented as a plurality of data values of data attribute variables 114, a cardinality of the first plurality of data records 112 being substantially large. For example, a group of items may be determined as "substantially large" based on the base population of the group. For example, a group that includes a human population of the United States may be determined as "substantially large" relative to a group of members of a local community club. However, in certain circumstances, the group of members of a local community club may be determined as "substantially large" relative to an outstanding group of applicants for membership to the club. For example, in some cases, a "substantially large" group may include hundreds of items, while in other cases, a "substantially large" group may include millions, or billions, of items (or hundreds of thousands of items).

According to an example embodiment, the particle based visualization engine 106, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 104 is depicted as external to the particle based visualization engine 106 in FIG. 1, one skilled in the art of data processing will appreciate that the device processor 104 may be implemented as a single component, and/or as distributed units which may be located internally or externally to the particle based visualization engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

According to an example embodiment, the particle based visualization engine 106 may be implemented in association with one or more user devices. For example, the particle based visualization engine 106 may communicate with a server, as discussed further below.

For example, an entity repository 116 may include one or more databases, and may be accessed via a database interface component 118. One skilled in the art of data processing will appreciate that there are many techniques for storing repository information discussed herein, such as various types of database configurations (e.g., relational databases, hierarchical databases, distributed databases) and non-database configurations.

According to an example embodiment, the particle based visualization engine 106 may include a memory 120 that may store the multivariate data 110 (e.g., or a representation thereof, or portions thereof). In this context, a "memory" may include a single memory device or multiple memory devices configured to store data and/or instructions. Further, the memory 120 may span multiple distributed storage devices.

According to an example embodiment, a user interface component 122 may manage communications between a user 124 and the particle based visualization engine 106. The user 124 may be associated with a receiving device 126 that may be associated with a display 128 and other input/output devices. For example, the display 128 may be configured to communicate with the receiving device 126, via internal device bus communications, or via at least one network connection.

According to example embodiments, the display 128 may be implemented as a flat screen display, a print form of display, a two-dimensional display, a three-dimensional display, a static display, a moving display, sensory displays such as tactile output, audio output, and any other form of output for communicating with a user (e.g., the user 124).

According to an example embodiment, the particle based visualization engine 106 may include a network communication component 130 that may manage network communication between the particle based visualization engine 106 and other entities that may communicate with the particle based visualization engine 106 via at least one network 132. For example, the network 132 may include at least one of the Internet, at least one wireless network, or at least one wired network. For example, the network 132 may include a cellular network, a radio network, or any type of network that may support transmission of data for the particle based visualization engine 106. For example, the network communication component 130 may manage network communications between the particle based visualization engine 106 and the receiving device 126. For example, the network communication component 130 may manage network communication between the user interface component 122 and the receiving device 126.

A template acquisition component 134 may be configured to obtain a first display layout template 136 representing a first collectivized visualization of pluralities of dataset points, the first collectivized visualization logically associated with a first set of the data attribute variables 114, from a perspective of a user viewer, as discussed further below.

A display representation determination component 138 may be configured to determine a first individualized particulate display representation 140 for each of the data records in the first plurality of data records 112, based on at least a portion of the data values associated with each respective one of the data records in the first plurality of data records 112, the first individualized particulate display representation 140 including a discrete, individually selectable first particulate shape 142 and a first display location 144 relative to geometric bounds associated with the first display layout template 136.

A display interface component 146 may be configured to initiate a first display of the first individualized particulate display representations 140 in accordance with the first display layout template 136.

An animated transition display interface component 148 may be configured to initiate an animated first transition display representing an animated transitional view of the first individualized particulate display representations 140 in the first display, temporally transitioning to second individualized particulate display representations 150 in a second display.

For example, a selection display component 152 may be configured to initiate a display of one or more selectable options 154 to a device user, the selectable options 154 including one or more of a data filter of the data attribute variables 114, a data filter of values of one or more of the data attribute variables 114, a data filter of sources of the multivariate data 110, a template indicator indicating a template associated with a layout of a bar chart outline for displayed enclosure of the first individualized particulate display representations 140, a template indicator indicating a template associated with a layout of a stacked bar chart outline for displayed enclosure of the first individualized particulate display representations 140, a template indicator indicating a template associated with a layout of a geographical map outline for displayed enclosure of the first individualized particulate display representations 140, a template indicator indicating a template associated with a histogram layout for display of the first individualized particulate display representations 140, a template indicator indicating a template associated with a scatter plot layout for display of the first individualized particulate display representations 140, a template indicator indicating a template associated with a layout of a pie chart outline for displayed enclosure of the first individualized particulate display representations 140, a template indicator indicating a template associated with a layout of a geometric shape outline for displayed enclosure of the first individualized particulate display representations 140, a color selection associated with one or more of the data attribute variables 114, a geometric shape selection associated with one or more of the data attribute variables 114, an animation selection associated with one or more of the data attribute variables 114, a visualization opacity selection associated with one or more of the data attribute variables, a gamma function indicator indicating selectable skew attributes for association with selected display objects, a gradient indicator indicating selectable gradient values for association with one or more of the data attribute variables, or a transition indicator indicating transitional display attributes for the animated first transition display.

For example, selections within visualizations may include mouse hover, mouse click, region selections (e.g., rectangular and elliptical regions, or free-form "lassos"), and area cursors (e.g., "brushes" or dynamic selectors which, e.g., may select the item currently closest to a mouse pointer, or other type of pointer).

For example, a particulate display representation arrangement component 156 may be configured to determine an ordered display arrangement 158 of the respective particulate shapes 142 associated with respective ones of the data records 112, based on an arrangement function 160 of one or more of the data attribute variables 114.

For example, the arrangement function 160 may include one or more of input logic obtained from a device user, or an arrangement function 160 that is based on a mapping of at least a portion of the data attribute variables 114 represented as points in k-dimensional space, to locations in a display space associated with a display device that is associated with the first display. For example, a user may prefer to design their own personalized arrangement logic, or they may prefer to use arrangement logic provided with a system. For example, the user may be offered selectable options for the arrangement logic.

For example, the arrangement function 160 may be based on substantially preserving relative pairwise arrangements of pairs of the first individualized particulate display representations 140 in the first display, in transitions to corresponding second individualized particulate display representations 150 in the second display. For example, the relative arrangements may include one or more of a relative arrangement of the pairs in a vertical direction in the first display, a relative arrangement of the pairs in a horizontal direction in the first display, a relative arrangement of the pairs in a separation distance aspect in the first display, or a relative arrangement of the pairs in a closeness aspect in the first display. For example, a goal of a transition involving an appearance of moving display elements may involve avoiding a visual appearance of crossing of display elements during the movement, while preserving (at least) "higher than" and "lower than" relationships among the display elements, from one view to the next. For example, if a first display element is higher than a second element (e.g., higher on a latitudinal axis) in a first view, then it may be desired that the first display element may continue to appear higher than the second element in a moving transition, from a first state to a final state (e.g., a second view), and that the two elements will not appear to cross each other in display, during the transitional movement.

For example, a selection acquisition component 162 may be configured to obtain one or more selection indicators 164 from a device user. The selection indicators 164 may include one or more of a selection of a geometric area that is included in the first display, a selection of one or more selectable options 154, in response to a display of the one or more selectable options 154 for selection by the device user, a selection of a hover display of one of the data records 112, based on a selection of a hover display of a corresponding one of the first individualized particulate display representations 140 that is displayed in the first display, or a selection of one of the data records 112, based on a selection of a corresponding one of the first individualized particulate display representations 140 that is displayed in the first display.

For example, the template acquisition component 134 may be configured to obtain a second display layout template 170 representing a second collectivized visualization of pluralities of dataset points, the second collectivized visualization logically associated with a second set of the data attribute variables 114, from the perspective of the user viewer.

For example, the display representation determination component 138 may be configured to determine respective second individualized particulate display representations 150 for each of the data records in a second plurality of data records 112 that are included in the set of multivariate data 110, based on at least a portion of the data values associated with each respective one of the data records in the second plurality of data records 112, each of the second individualized particulate display representations 150 including a discrete, individually selectable second particulate shape 172 and a second display location 174 relative to geometric bounds associated with the second display layout template 170.

For example, the display interface component 146 may be configured to initiate the second display of the second individualized particulate display representations 150 in accordance with the second display layout template 170.

Figure 2:
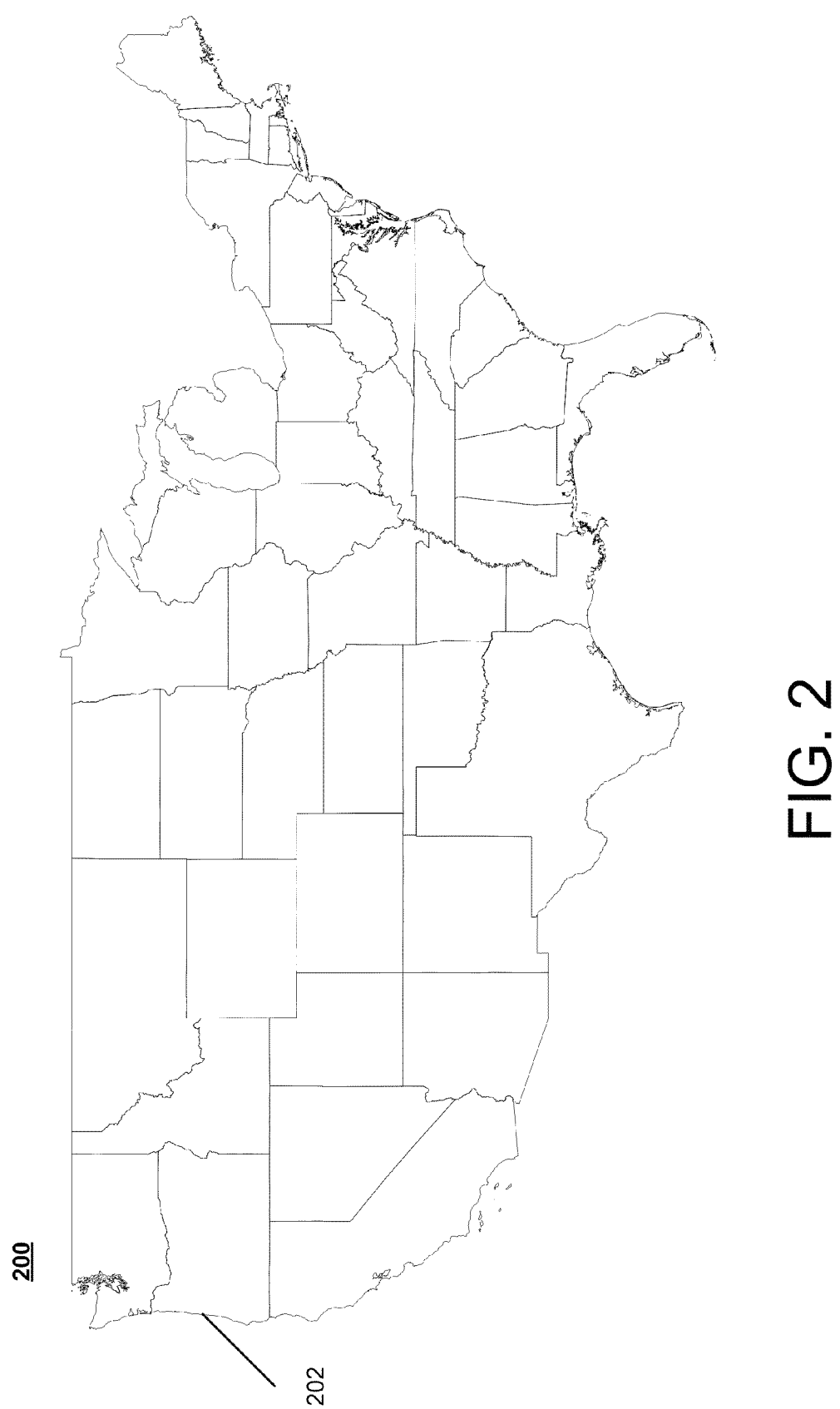
FIG. 2 illustrates an example geographical map template.

FIG. 2 illustrates an example geographical map template. For example, the map 202 of FIG. 2 illustrates a geographical map of the contiguous states of the United States in North America. Although not shown in FIG. 2, many records of various datasets may be easily mapped to a template associated with the geographical map (e.g., records associated with people or other objects located within the geographical boundaries as illustrated in FIG. 2). For example, records associated with people living in the United States may be naturally mapped to the geographical coordinates of their residence (or work) address, within the map illustrated in FIG. 2. Further, the records may be individually represented (in a "particulate" format) as individualized shapes, with individualized visual attributes (e.g., color, effects, etc.). For example, the President of the United States may be visualized in Washington, D.C., as a flashing particulate entity (e.g., flashing red, white, blue coloring), and may be transitioned to a different view as an outlier point, at which time the point may be even more easily noticed (in a visual sense), to be individually selected for further investigation of information associated with the associated record.

For example, a user may enter a request for a highlighted effect of records associated with people living in U.S. states that have name abbreviations beginning with the letter "T" (e.g., via a selection input menu). In response, a transitioned view may display individualized particulate shapes associated with people living in the selected states, with bright yellow highlighting effects. It may then be possible to select individual ones of the highlighted individualized particulate shapes, as displayed in the map 202, for further analysis or processing. Further, it may be possible to select a group of the highlighted individualized particulate shapes, for further analysis or processing. For example, a transition may be provided based on the user's entry of a second letter of the name abbreviation (e.g., entry of an "X" following the "T"), such that the transitioned view focuses only on the state of Texas. For example, selected shapes may be further filtered and transitioned, in accordance with desired properties for viewing.

For example, a police detective user may select a particular geographic area based on a "lasso" selection of the desired focal area, and may then request that selected data from all data records represented as located within that displayed focal area be sent to a crime lab system for further processing. For example, the detective may wish to determine certain demographics associated with the area, or may wish to filter various characteristics of people or organizations in the area, in hopes of finding potential crime suspects, witnesses, or potential future victims of various crimes.

Figure 3A:
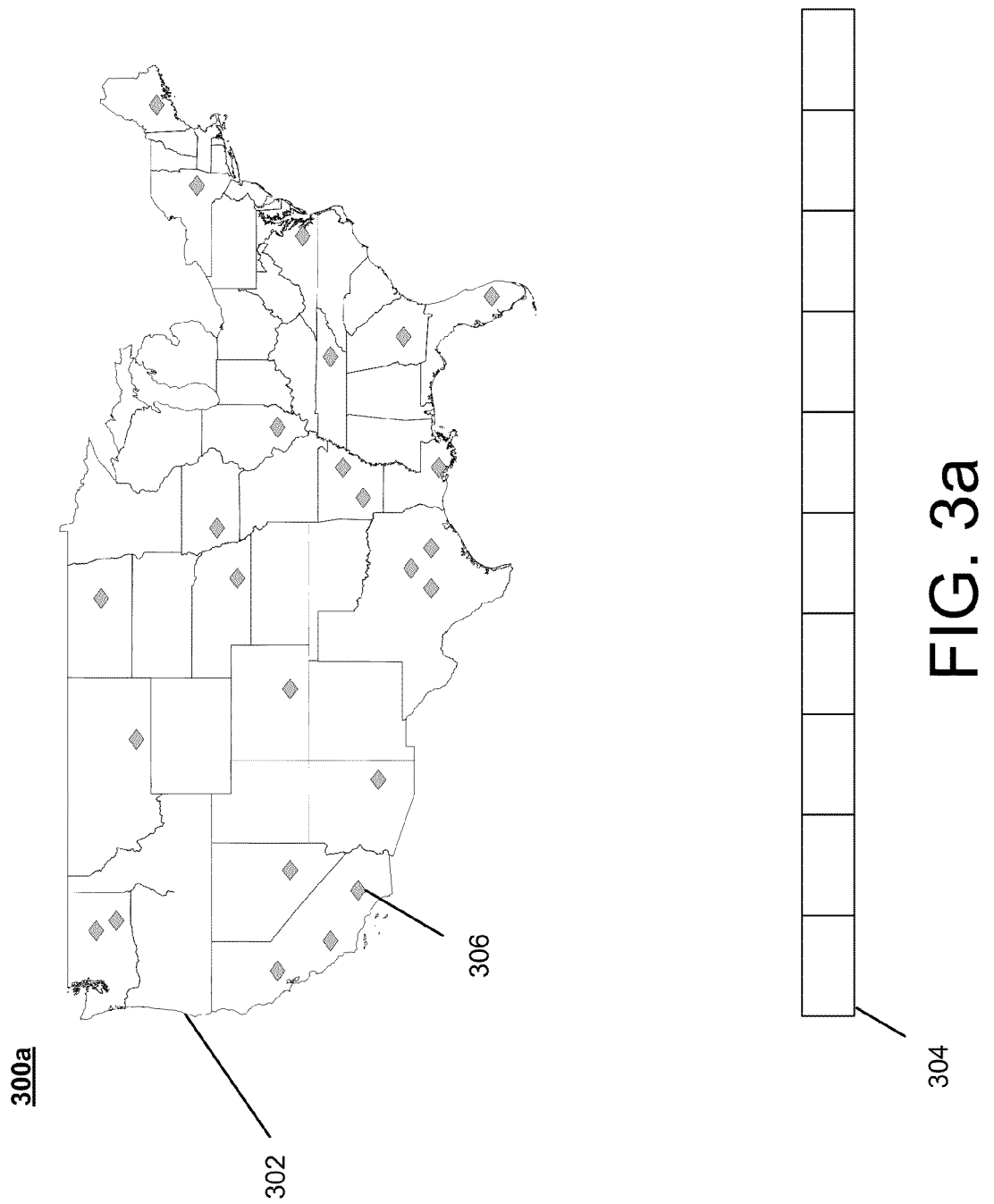

FIGS. 3a-3d illustrate an example geographical map template and bar chart template, with representations of filtered data records for animated transitioning from one display format to another. As shown in FIG. 3a, a map 302 and a bar chart template 304, are displayed (e.g., in association with selections of the corresponding display templates by a user). As shown in FIG. 3a, individualized particulate shapes (e.g., shape 306) corresponding to individual records in a multivariate dataset, are shown, located relative to each other in the map 302 based on their respective geographic locations (e.g., based on a filter selection of a data attribute associated with geographic locations). For example, the individualized particulate shape 306 may be displayed as a diamond geometric shape, based on a decision of a company manager to display his/her outstanding salespeople with a "diamond" shape (e.g., based on filtering ranges of sales information included in each salesperson's record). Thus, for example, a user may be able to select one of the individualized particulate shapes displayed within the bounds of the map 302, to process the associated data record further (e.g., view data in the record, drag and drop the record information in another work area, etc.).

Figure 3B:
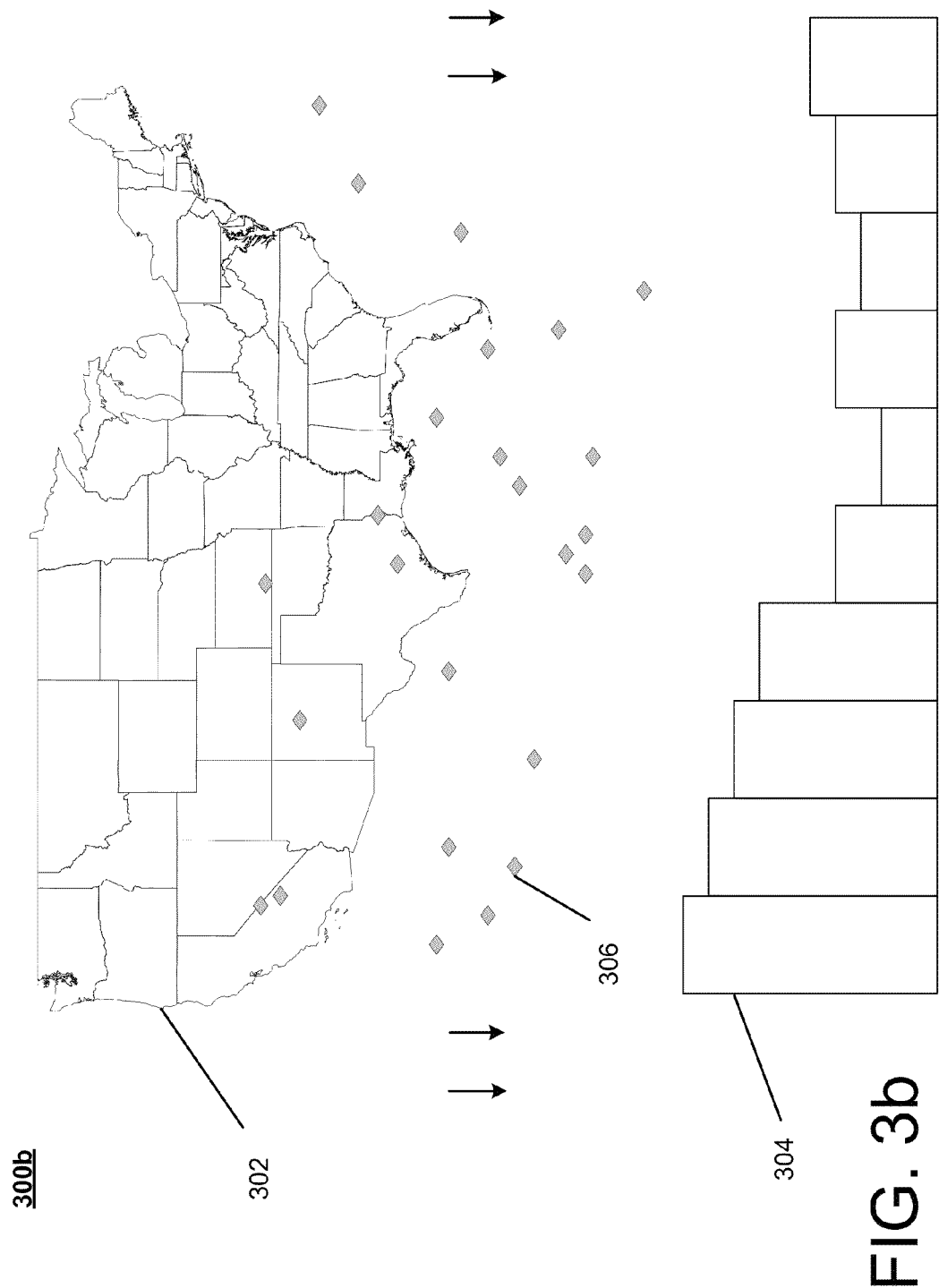

FIG. 3b illustrates a "frame" in an animated transition of the displayed individualized particulate shapes from the map 302 to the bar chart 304. As shown in FIG. 3b, the displayed individualized particulate shapes are represented as temporally moving from the map 302 to the bar chart 304, while substantially preserving their relative pairwise positioning with regard to each other. Further, the bars of the bar chart 304 are expanding/contracting in accordance with values of attributes that will be used for determining the relative heights of the bar chart bars, with the information associated with the displayed individualized particulate shapes that are moving toward the bars in FIG. 3b. For example, the individualized particulate shapes may be transitioned such that they retain their relative ordering along an x-y axis during the move from one template representation to the other. For example, a manager may be interested in a comparative visualization of total sales in various regions (along the x-axis view) of the contiguous states. For example, individualized sizes of the diamond shapes may provide a visual representation of the relative total sales of each respective salesperson. FIGS. 3c-3d illustrate the continued transitional movement of the displayed individualized particulate shapes from the map 302 to the bar chart 304.

Figure 3E:
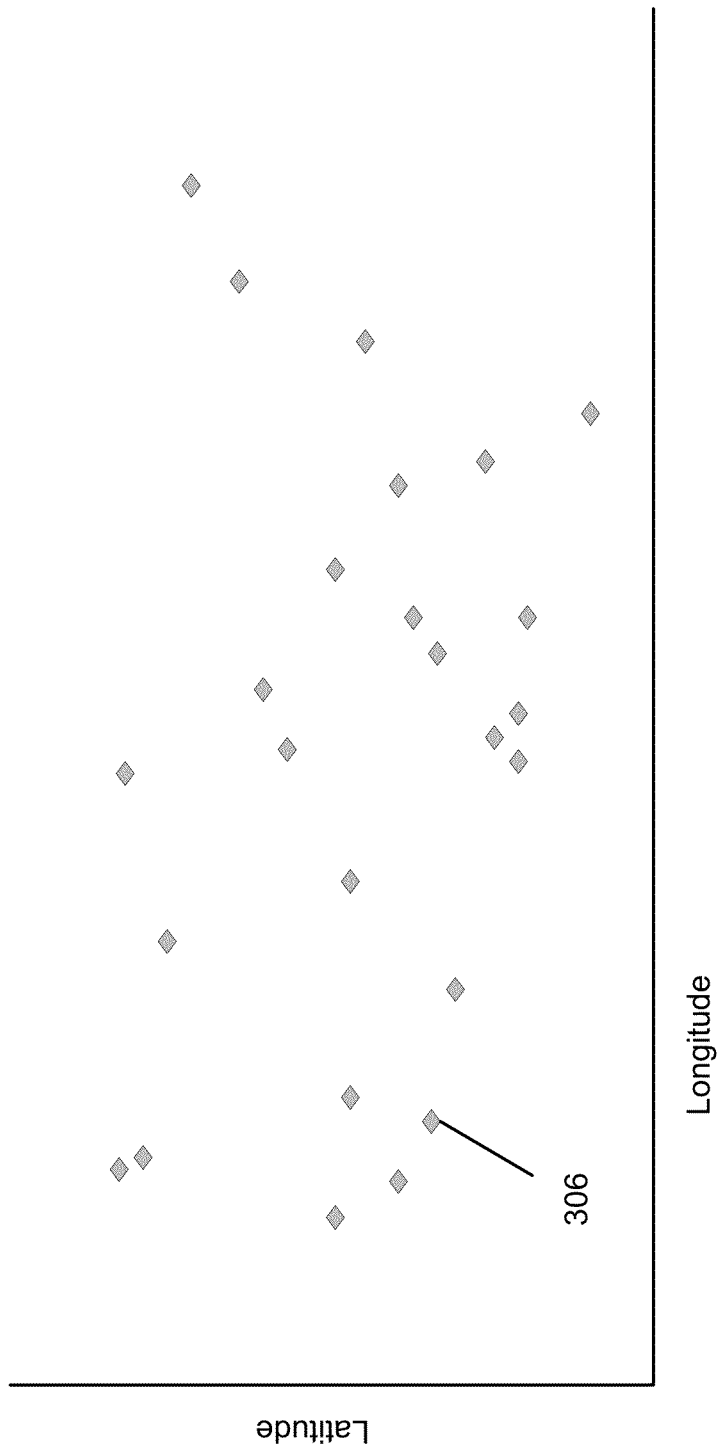

As shown in FIG. 3e, the map 302 may be transitioned to a scatter plot 300e having latitudinal and longitudinal axes, preserving the relative positions of the displayed individualized particulate shapes, from the map 302 to the scatter plot 300e display. Although not shown, it may be possible to select attributes such as "total number of sales per salesperson," to obtain a display of the individualized particulate shapes having varying sizes, in accordance with their varying total numbers of sales. It may also be possible to request a similar type of display, requesting "total sales amounts per salesperson," to obtain a transition to a display of the individualized particulate shapes having varying sizes, in accordance with their varying total sales amounts.

Figure 4A:
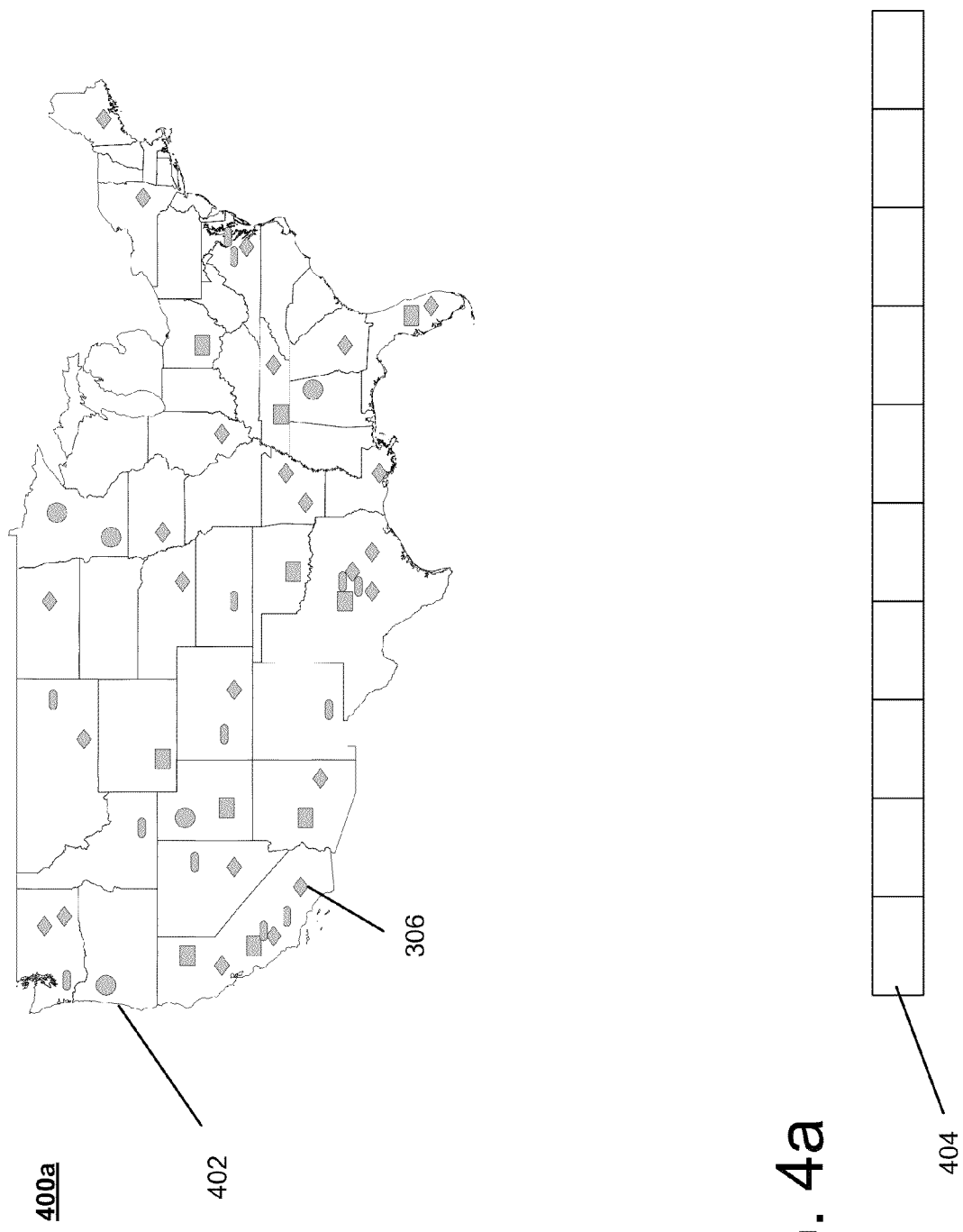
Figure 4B:
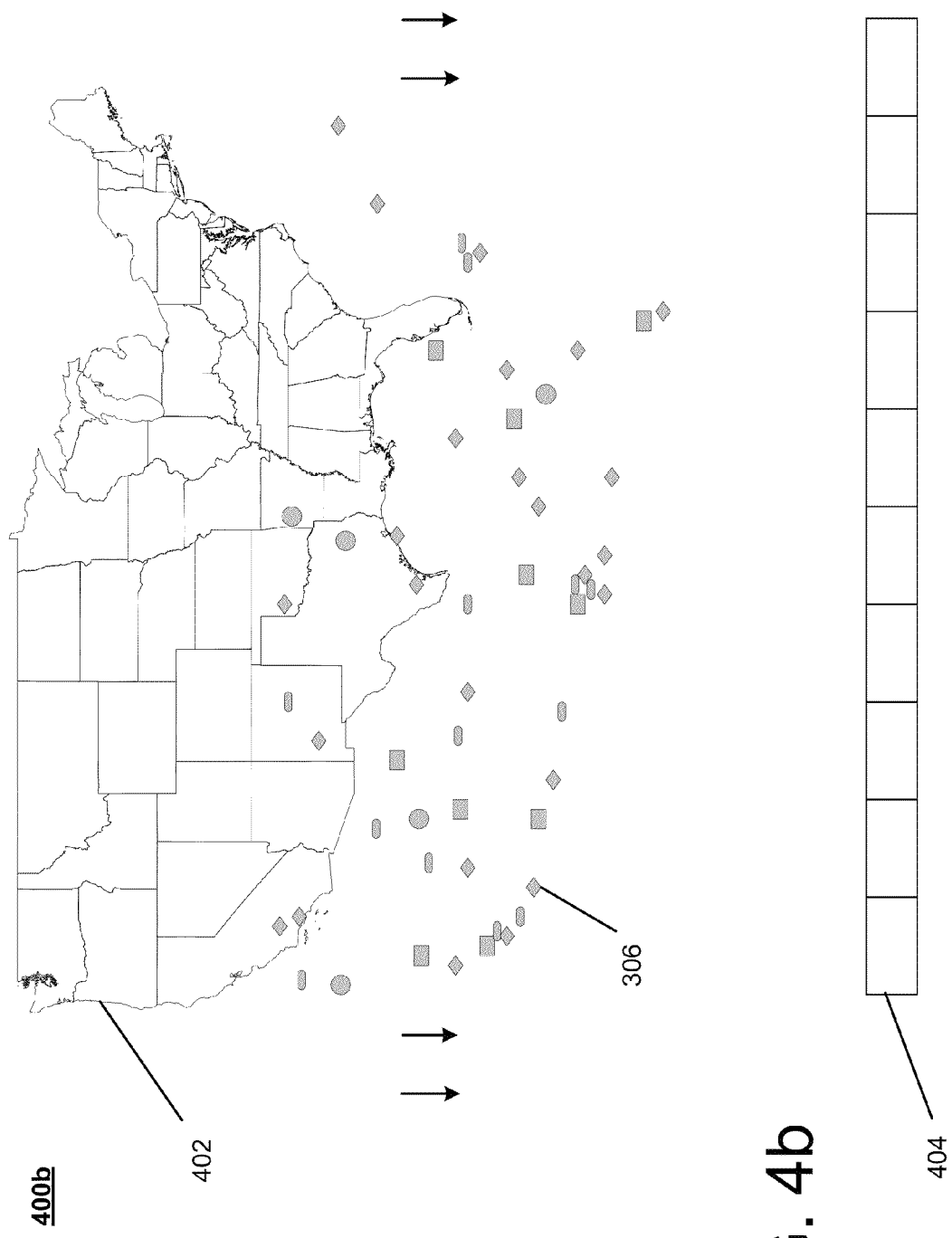
Figure 4C:
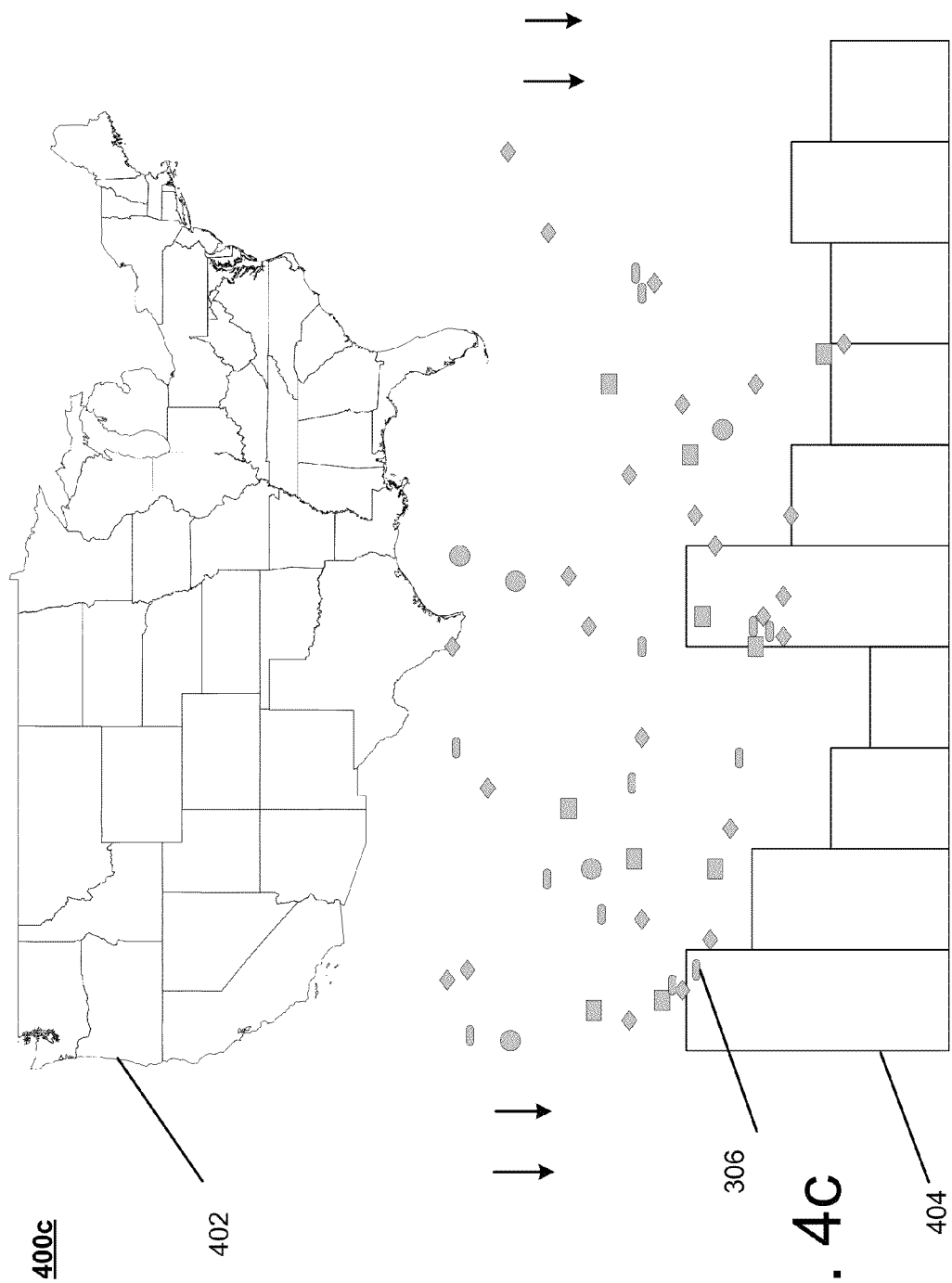

FIGS. 4a-4e illustrate an example geographical map template and bar chart template, with representations of filtered data records for animated transitioning from one display format to another. As shown in FIG. 4a, multiple shape types may be used for various different attributes associated with the data records that are represented by the individualized particulate shapes. For example, a user may request that the points be transitioned from a map 402 to a bar chart 404, similarly as discussed above with regard to FIGS. 3a-3d. For example, a "box" shape may represent a salesperson of a competitor of a user of the system, so that the user may visually analyze different results of the competition, in comparison with the user's own salespeople. As shown in FIGS. 4b-4d, the individualized particulate shapes move from the map 402 to the bar chart 404 via animated transitioning, as discussed above.

Figure 4E:
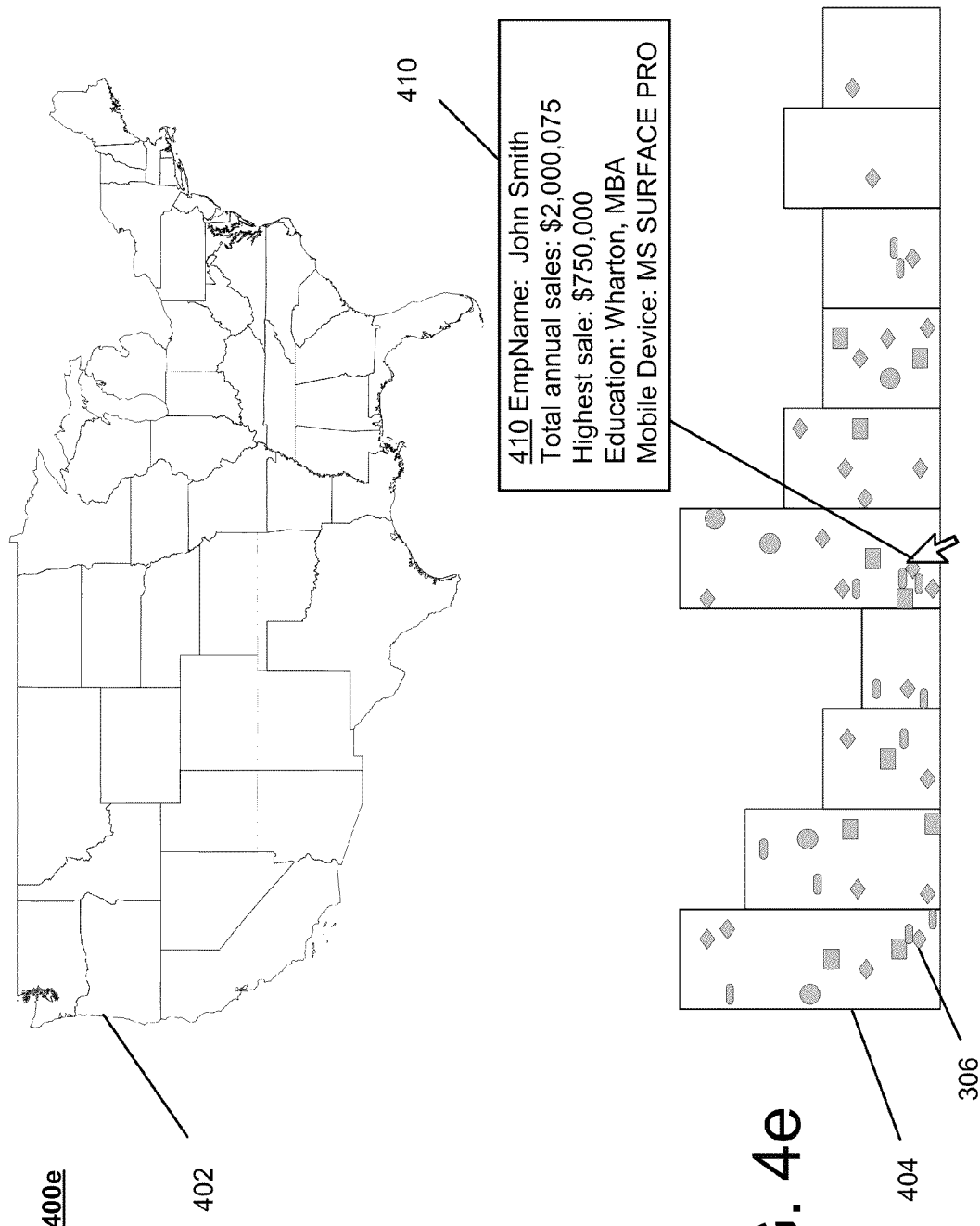

FIG. 4e illustrates a selection of a single individualized particulate shape, after its transition to the bar chart 404. As shown in the example of FIG. 4e, values of attribute variables from the associated data record may be displayed (e.g., on a display device). For example, the user may select the corresponding record for further processing.

For example, in transitioning from a template such as a map to a template such as a bar chart, a user may wish to obtain transitioning arrangements of the representations of respective data records that are based on binning the respective data records (e.g., via assigning a bin to each bar of a bar chart representation, and assigning each respective record to an appropriate bin, in accordance with longitude data associated with the respective record, and longitude data associated with the respective bar).

For example, in such a transition, the respective records may be assigned to respective bins for the bars, and bin totals may be determined. For example, for three bars, an example transition may involve a total of 150 for a first bar, a total of 75 for a second bar, and a total of 200 for a third bar. The total display area may be considered, and a display associated with the three bars may be determined based on apportioning the total display area with the third bar information displayed as the tallest bar (e.g., displayed as occupying a maximal height area for the bar chart), and the information of the other two bars may be displayed in proportional display sizes, in accordance with their respective totals.

For example, staged transitions may be used where, for example, in a first stage, shapes may be represented temporally as moving horizontally (to align with bin destinations) and in a second stage, they may be represented as moving vertically (e.g., represented temporally as to moving into the bin containers, such as bars associated with a bar chart representation).

For example, the representations of the respective data records may be visually represented as "layered" within the bin containers, with visual ordering of the representations of the respective data records within the layers determined in accordance with ordered values of an attribute such as a data record attribute selected by the user.

For example, if the user has requested that the totals be based on counts of sales (i.e., numbers of sales), then the representations of the respective data records may be binned based on their corresponding longitude information, and may be ordered within the bin based on (at least) their respective numbers of sales. For example, each respective record may also be represented as a proportionally sized granular point in its respective bar, with the total binned records considered in apportioning proportional sizes of each respective display representation, such that each bin is displayed as the collective particulate display of the binned and ordered representations of the respective data records, proportional within bars, and proportional for fitting the bar chart within the viewable display area.

For example, the user may be viewing the display based on counts of sales, and may wish to view a transition to a view that is based on each salesperson's total sales amounts. For example, such a transition may include a resizing of each bar, as well as resizing (and potentially re-ordering) the respective representations of the data records, in accordance with their respective total sales amounts (e.g., different from their respective total numbers of sales).

For example, stacked bars may also be used in bar chart representations, such that each stacked bar may represent a data attribute range (e.g., a total sales amount range), with the respective stacked bars sized proportionally to the respective sets of data records that are determined to fall within the ranges associated with each respective stacked bar chart box. Further, various visual aspects such as colors may be used to visually distinguish the record representations falling within various ranges. Thus, for example, a combination of location within stacked bars, and various colorings of the representations of the data records (based on various attributes of the data records) may aid a viewing user in determining relationships among the records based on various attributes. As discussed herein, each individual one of the representations of the data records may be individually selected from any of the various displays, for further investigation, or for further processing based on the particular selection.

Figure 5:
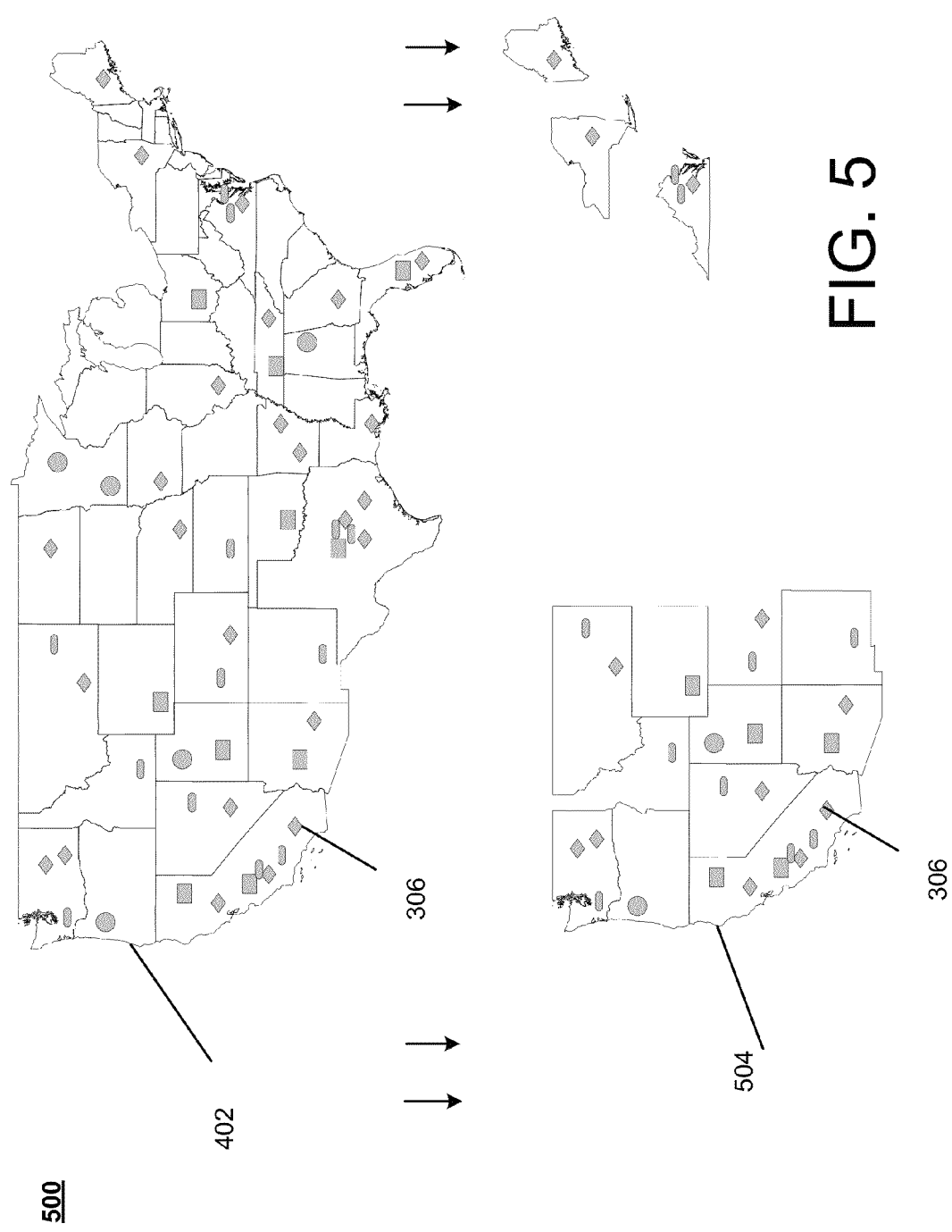
FIG. 5 illustrates an example filtered geographical map template, with representations of filtered data records for animated transitioning from one display format to another.

FIG. 5 illustrates an example filtered geographical map template, with representations of filtered data records for animated transitioning from one display format to another. As shown in FIG. 5, a user may select portions of the map 402, to focus on particular regions of the map 402, without consideration of the non-selected portions. For example, the user may drag over the desired regions, or may enter information identifying the regions (e.g., touching, pointing, typing identifying information about the regions). As a result of the selection, the displayed representations may be transitioned to the view shown at the bottom of FIG. 5.

As another example, a user may select particular portions of the map 402 for withdrawal of the selected portions (e.g., as a "brushing out" effect), so that only non-selected portions are transitioned to a next view.

One skilled in the art of data processing will appreciate that many different techniques may be used for providing animated particle based visualizations, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

FIG. 6 is a flowchart illustrating example operations of the system of FIG. 1, according to example embodiments. In the example of FIG. 6a, a set of multivariate data that includes a first plurality of data records may be obtained (602). Each of the records may be represented as a plurality of data values of data attribute variables, a cardinality of the first plurality of data records being substantially large. For example, the dataset acquisition component 108 may obtain the set of multivariate data 110 that includes a first plurality of data records 112, each of the records represented as a plurality of data values of data attribute variables 114, a cardinality of the first plurality of data records 112 being substantially large, as discussed above.

A first display layout template representing a first collectivized visualization of pluralities of dataset points may be obtained, the first collectivized visualization logically associated with a first set of the data attribute variables, from a perspective of a user viewer (604). For example, the template acquisition component 134 may obtain a first display layout template 136 representing a first collectivized visualization of pluralities of dataset points, the first collectivized visualization logically associated with a first set of the data attribute variables 114, from a perspective of a user viewer, as discussed above.

A first individualized particulate display representation for each of the data records in the first plurality of data records may be determined, based on at least a portion of the data values associated with each respective one of the data records in the first plurality of data records, the first individualized particulate display representation including a discrete, individually selectable first particulate shape and a first display location relative to geometric bounds associated with the first display layout template (606). For example, the display representation determination component 138 may determine the first individualized particulate display representation 140 for each of the data records in the first plurality of data records 112, based on at least a portion of the data values associated with each respective one of the data records in the first plurality of data records 112, the first individualized particulate display representation 140 including a discrete, individually selectable first particulate shape 142 and a first display location 144 relative to geometric bounds associated with the first display layout template 136, as discussed above.

A first display of the first individualized particulate display representations may be initiated, in accordance with the first display layout template (608). For example, the display interface component 146 may initiate a first display of the first individualized particulate display representations 140 in accordance with the first display layout template 136, as discussed above.

An animated first transition display representing an animated transitional view of the first individualized particulate display representations in the first display may be initiated, temporally transitioning to second individualized particulate display representations in a second display (610). For example, the animated transition display interface component 148 may initiate the animated first transition display representing an animated transitional view of the first individualized particulate display representations 140 in the first display, temporally transitioning to second individualized particulate display representations 150 in a second display, as discussed above.

Figure 6A:
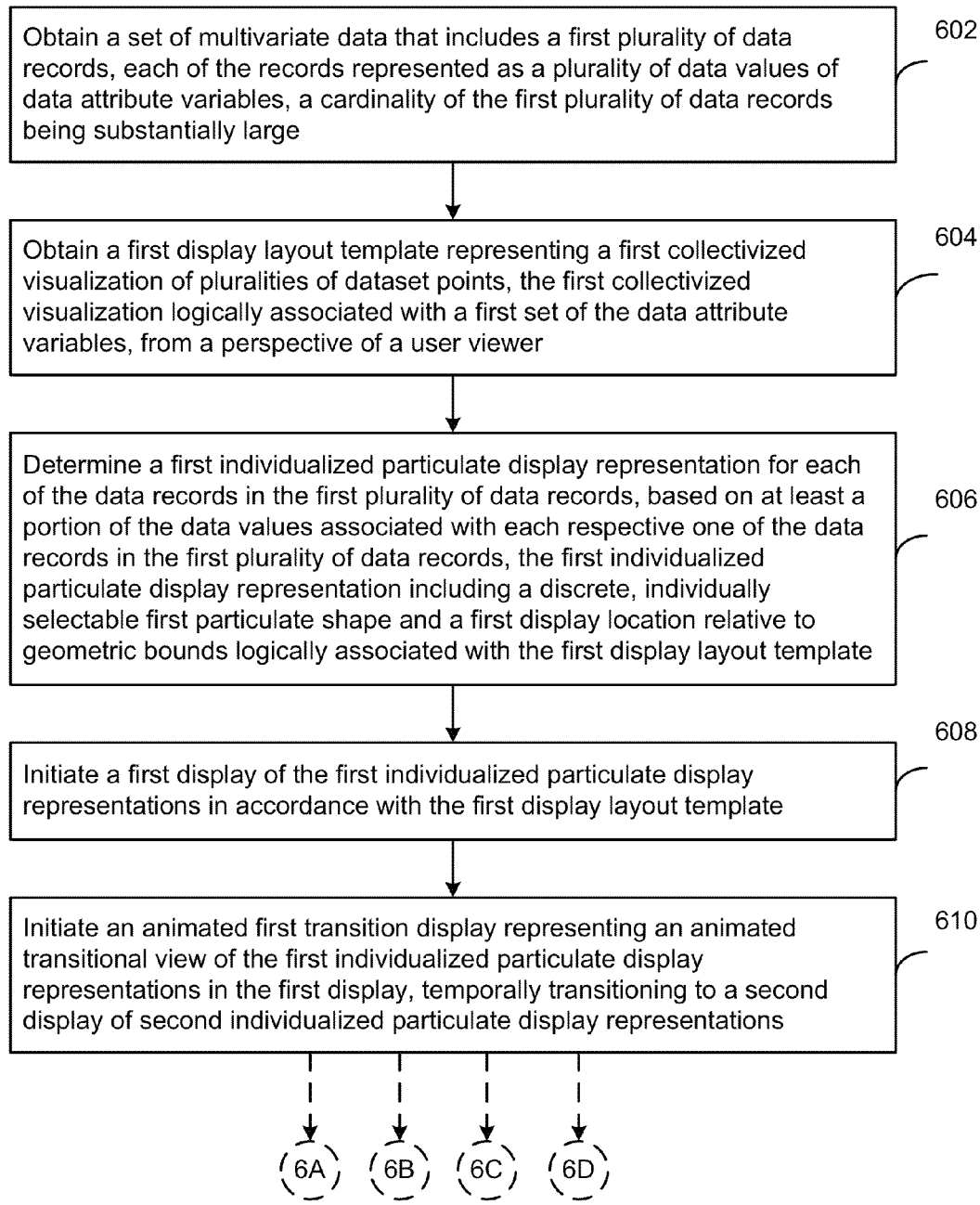
FIGS. 6a-6d are a flowchart illustrating example operations of the system of FIG. 1.
Figure 6B:
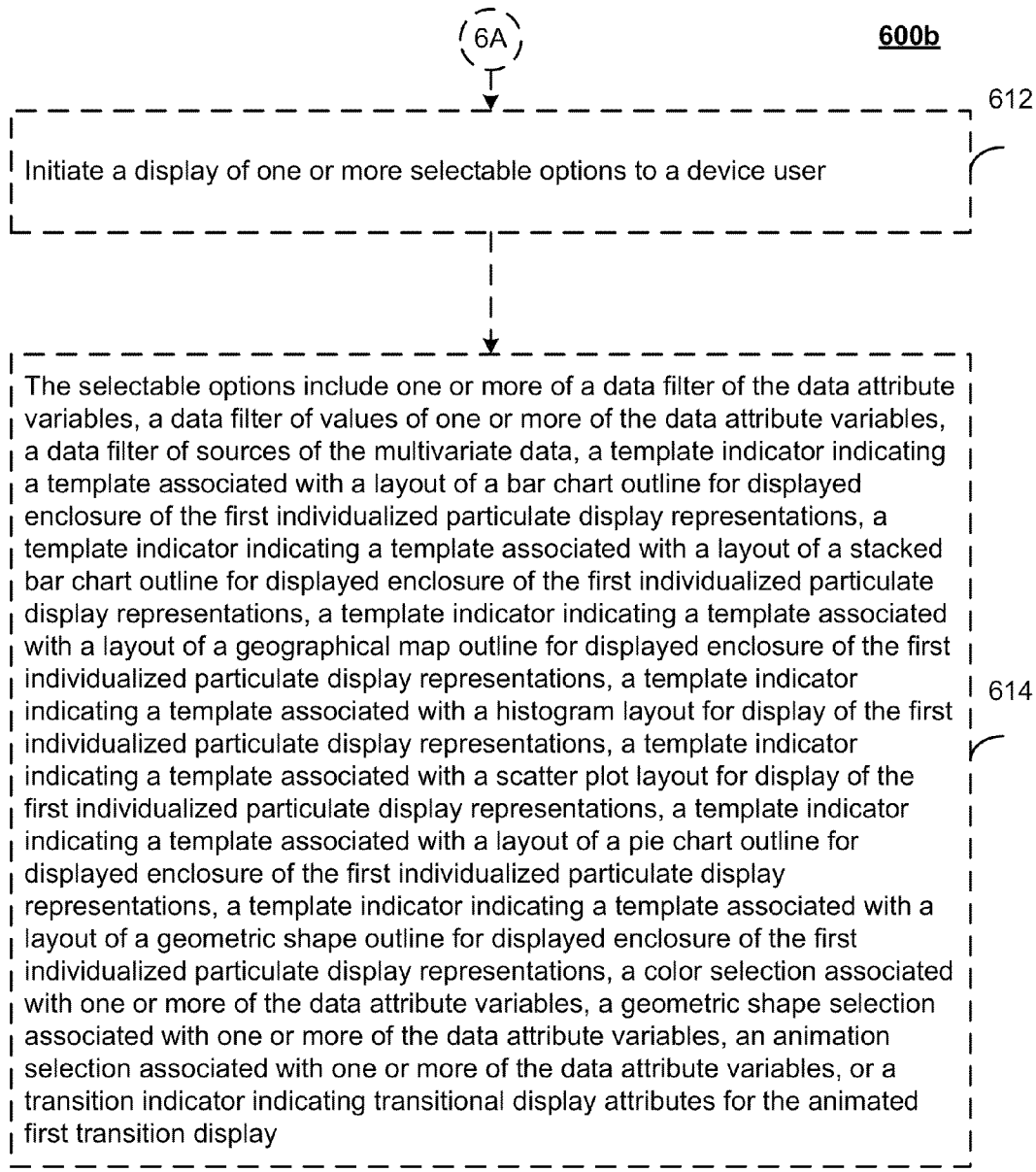

For example, a display of one or more selectable options to a device user may be initiated (612), in the example of FIG. 6b. For example, the selection display component 152 may initiate a display of one or more selectable options 154 to a device user, as discussed above.

For example, the selectable options may include one or more of a data filter of the data attribute variables, a data filter of values of one or more of the data attribute variables, a data filter of sources of the multivariate data, a template indicator indicating a template associated with a layout of a bar chart outline for displayed enclosure of the first individualized particulate display representations, a template indicator indicating a template associated with a layout of a stacked bar chart outline for displayed enclosure of the first individualized particulate display representations, a template indicator indicating a template associated with a layout of a geographical map outline for displayed enclosure of the first individualized particulate display representations, a template indicator indicating a template associated with a histogram layout for display of the first individualized particulate display representations, a template indicator indicating a template associated with a scatter plot layout for display of the first individualized particulate display representations, a template indicator indicating a template associated with a layout of a pie chart outline for displayed enclosure of the first individualized particulate display representations, a template indicator indicating a template associated with a layout of a geometric shape outline for displayed enclosure of the first individualized particulate display representations, a color selection associated with one or more of the data attribute variables, a geometric shape selection associated with one or more of the data attribute variables, an animation selection associated with one or more of the data attribute variables, or a transition indicator indicating transitional display attributes for the animated first transition display (614). Of course, many other layouts may be used for the visualizations, without departing from the spirit of the discussion herein, as will be apparent to one skilled in the art of data processing. Thus, the enumerated list here is not intended as exhaustive of all possibilities that may be covered by the discussion herein.

Figure 6C:
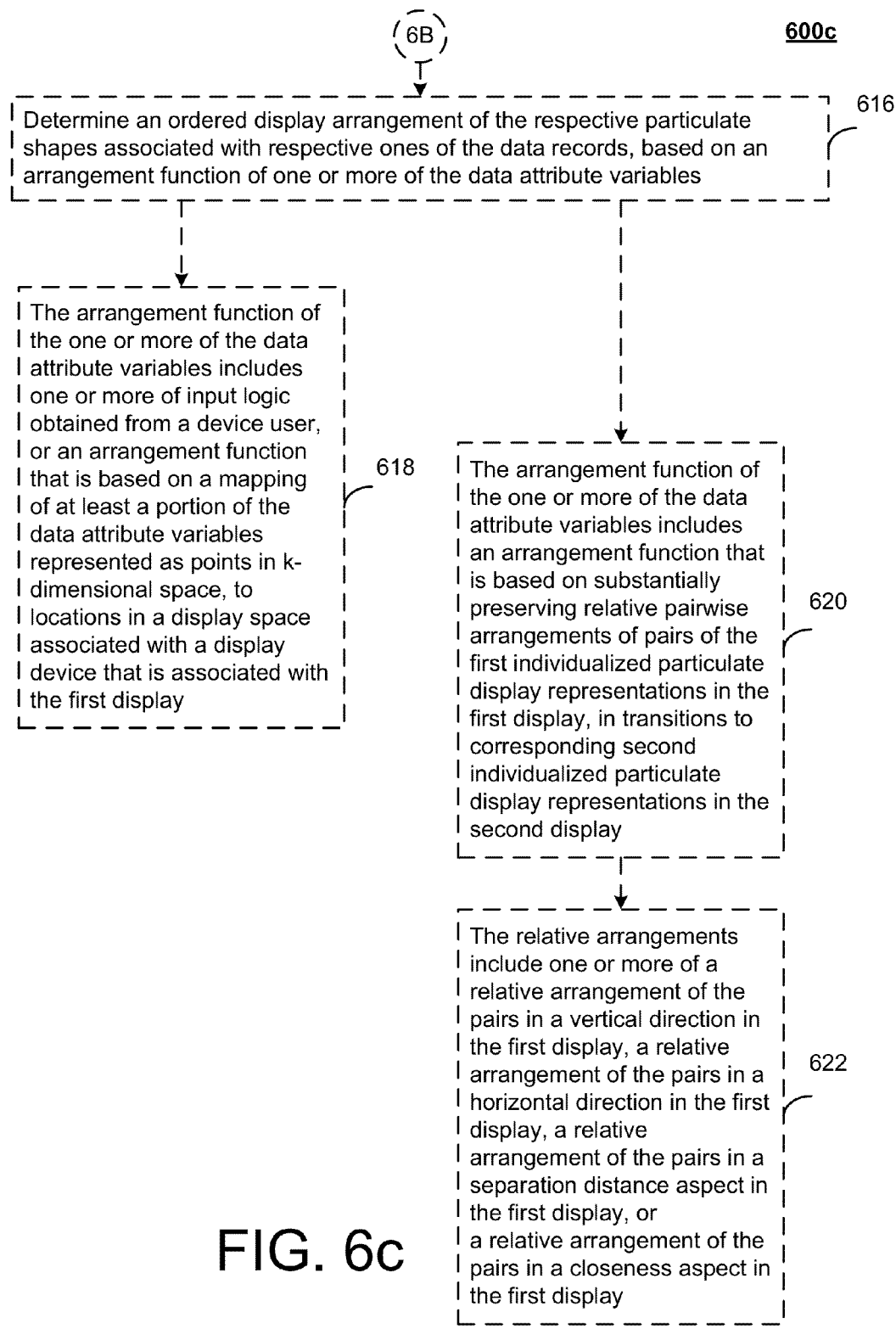

For example, an ordered display arrangement of the respective particulate shapes associated with respective ones of the data records may be determined, based on an arrangement function of one or more of the data attribute variables (616), in the example of FIG. 6c. For example, the particulate display representation arrangement component 156 may determine an ordered display arrangement 158 of the respective particulate shapes 142 associated with respective ones of the data records 112, based on an arrangement function 160 of one or more of the data attribute variables 114, as discussed above.

For example, the arrangement function of the one or more of the data attribute variables may include one or more of input logic obtained from a device user, or an arrangement function that is based on a mapping of at least a portion of the data attribute variables represented as points in k-dimensional space, to locations in a display space associated with a display device that is associated with the first display (618).

For example, the arrangement function of the one or more of the data attribute variables may include an arrangement function that is based on substantially preserving relative pairwise arrangements of pairs of the first individualized particulate display representations in the first display, in transitions to corresponding second individualized particulate display representations in the second display (620).

For example, the relative arrangements may include one or more of a relative arrangement of the pairs in a vertical direction in the first display, a relative arrangement of the pairs in a horizontal direction in the first display, a relative arrangement of the pairs in a separation distance aspect in the first display, or a relative arrangement of the pairs in a closeness aspect in the first display (622).

Figure 6D:
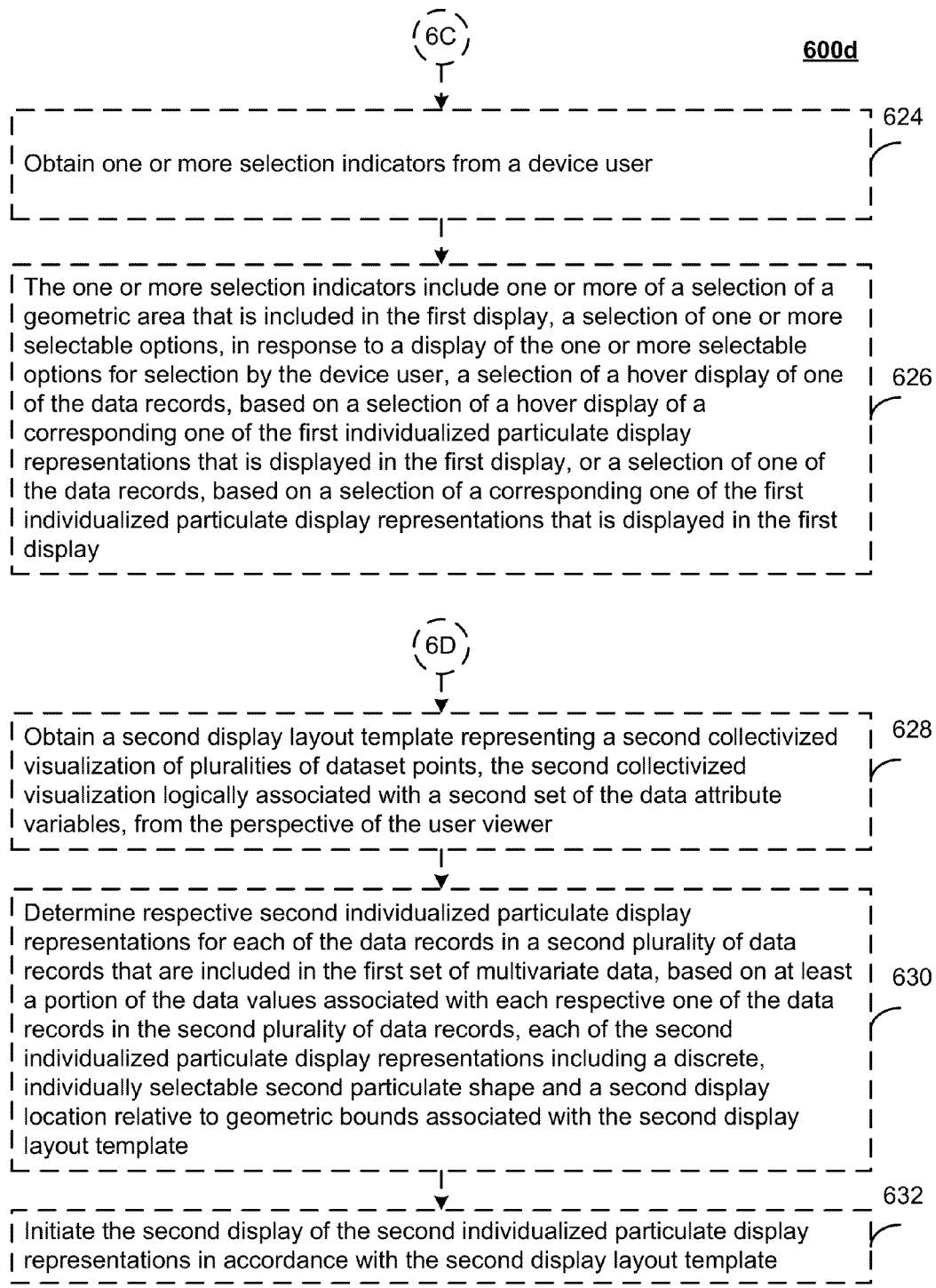

For example, one or more selection indicators may be obtained from a device user (624), in the example of FIG. 6d. For example, the selection acquisition component 162 may obtain one or more selection indicators 164 from a device user, as discussed above.

The one or more selection indicators may include one or more of a selection of a geometric area that is included in the first display, a selection of one or more selectable options, in response to a display of the one or more selectable options for selection by the device user, a selection of a hover display of one of the data records, based on a selection of a hover display of a corresponding one of the first individualized particulate display representations that is displayed in the first display, or a selection of one of the data records, based on a selection of a corresponding one of the first individualized particulate display representations that is displayed in the first display (626).

For example, a second display layout template representing a second collectivized visualization of pluralities of dataset points may be obtained, the second collectivized visualization logically associated with a second set of the data attribute variables, from the perspective of the user viewer (628). For example, the template acquisition component 134 may obtain the second display layout template 170 representing a second collectivized visualization of pluralities of dataset points, the second collectivized visualization logically associated with a second set of the data attribute variables 114, from the perspective of the user viewer, as discussed above.

For example, respective second individualized particulate display representations may be determined for each of the data records in a second plurality of data records that are included in the set of multivariate data, based on at least a portion of the data values associated with each respective one of the data records in the second plurality of data records, each of the second individualized particulate display representations including a discrete, individually selectable second particulate shape and a second display location relative to geometric bounds associated with the second display layout template (630). For example, the display representation determination component 138 may determine respective second individualized particulate display representations 150 for each of the data records in a second plurality of data records 112 that are included in the set of multivariate data 110, based on at least a portion of the data values associated with each respective one of the data records in the second plurality of data records 112, each of the second individualized particulate display representations 150 including a discrete, individually selectable second particulate shape 172 and a second display location 174 relative to geometric bounds associated with the second display layout template 170, as discussed above.

For example, the second display of the second individualized particulate display representations may be initiated, in accordance with the second display layout template (632). For example, the display interface component 146 may initiate the second display of the second individualized particulate display representations 150 in accordance with the second display layout template 170, as discussed above.

FIG. 7 is a flowchart illustrating example operations of the system of FIG. 1, according to example embodiments. In the example of FIG. 7a, a set of multivariate data that includes a first plurality of data records may be obtained (702). Each of the records may be represented as a plurality of data values of data attribute variables, a cardinality of the first plurality of data records being substantially large. For example, the dataset acquisition component 108 may obtain the set of multivariate data 110 that includes a first plurality of data records 112, each of the records represented as a plurality of data values of data attribute variables 114, a cardinality of the first plurality of data records 112 being substantially large, as discussed above.

A first display layout template representing a first collectivized visualization of pluralities of dataset points may be obtained, the first collectivized visualization logically associated with a first set of the data attribute variables, from a perspective of a user viewer (704). For example, the template acquisition component 134 may obtain a first display layout template 136 representing a first collectivized visualization of pluralities of dataset points, the first collectivized visualization logically associated with a first set of the data attribute variables 114, from a perspective of a user viewer, as discussed above.

A first individualized particulate display representation may be determined for each of the data records in the first plurality of data records, based on at least a portion of the data values associated with each respective one of the data records in the first plurality of data records, the first individualized particulate display representation including a discrete, individually selectable first particulate shape and a first display location relative to geometric bounds associated with the first display layout template (706). For example, the display representation determination component 138 may determine the first individualized particulate display representation 140 for each of the data records in the first plurality of data records 112, based on at least a portion of the data values associated with each respective one of the data records in the first plurality of data records 112, the first individualized particulate display representation 140 including a discrete, individually selectable first particulate shape 142 and a first display location 144 relative to geometric bounds associated with the first display layout template 136, as discussed above.

A first display of the first individualized particulate display representations may be initiated, in accordance with the first display layout template (708). For example, the display interface component 146 may initiate a first display of the first individualized particulate display representations 140 in accordance with the first display layout template 136, as discussed above.

Figure 7A:
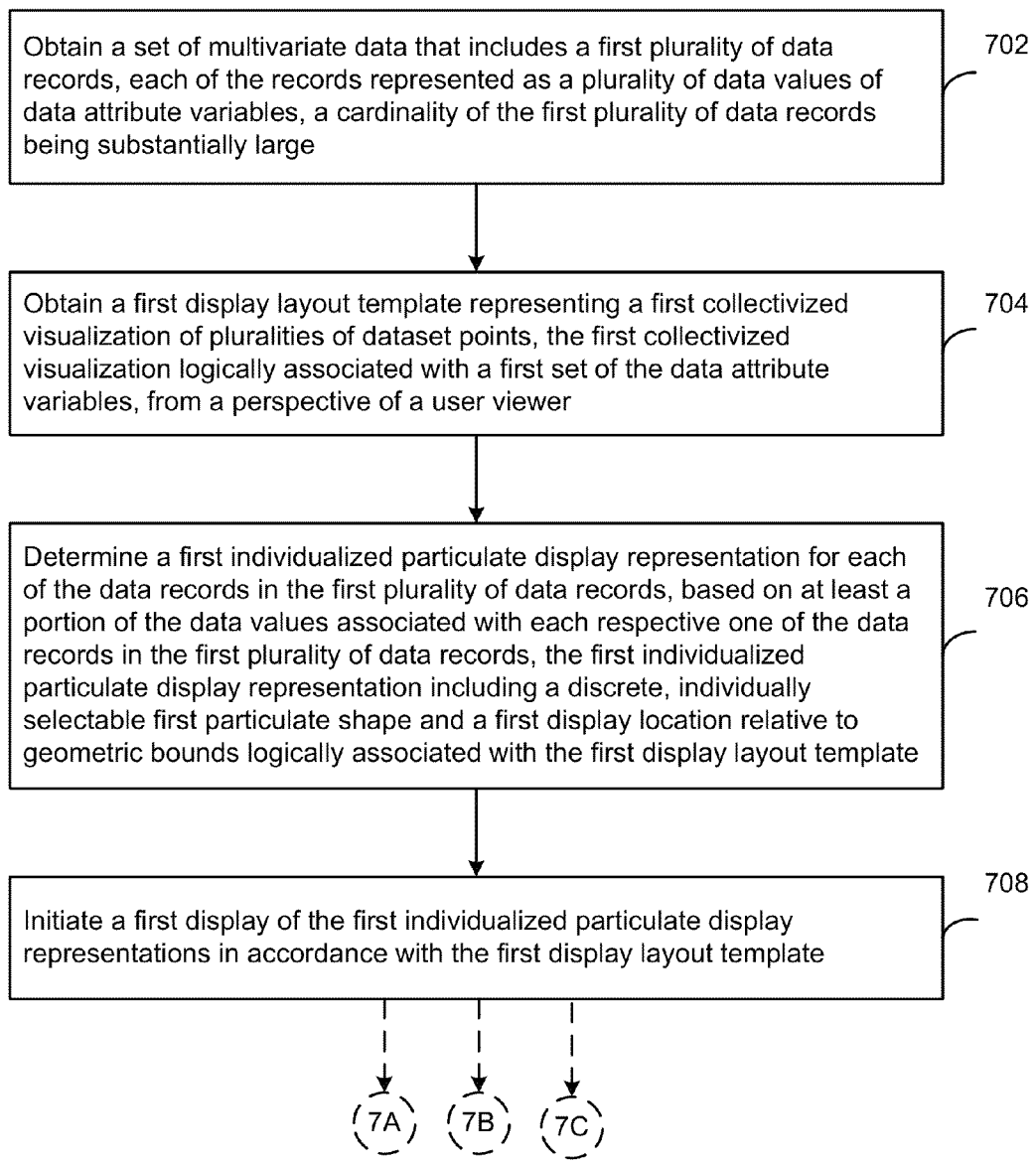
FIGS. 7a-7d are a flowchart illustrating example operations of the system of FIG. 1.
Figure 7B:
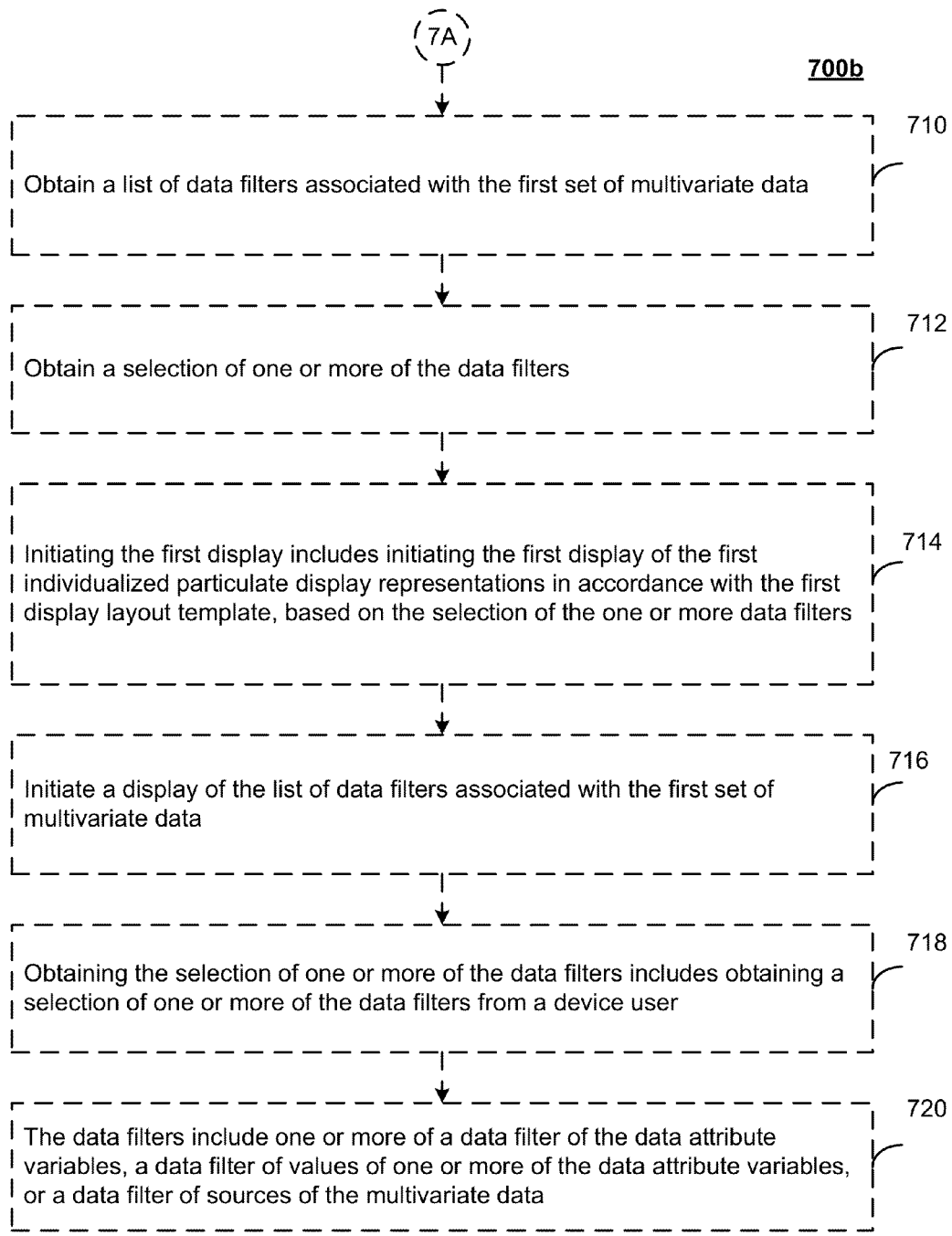

For example, a list of data filters associated with the set of multivariate data may be obtained (710), in the example of FIG. 7b. For example, a selection of one or more of the data filters may be obtained (712).

For example, initiating the first display may include initiating the first display of the first individualized particulate display representations in accordance with the first display layout template, based on the selection of the one or more data filters (714).

For example, a display of the list of data filters associated with the set of multivariate data may be initiated (716).

For example, obtaining the selection of one or more of the data filters may include obtaining a selection of one or more of the data filters from a device user (718).

For example, the data filters may include one or more of a data filter of the data attribute variables, a data filter of values of one or more of the data attribute variables, or a data filter of sources of the multivariate data (720).

Figure 7C:
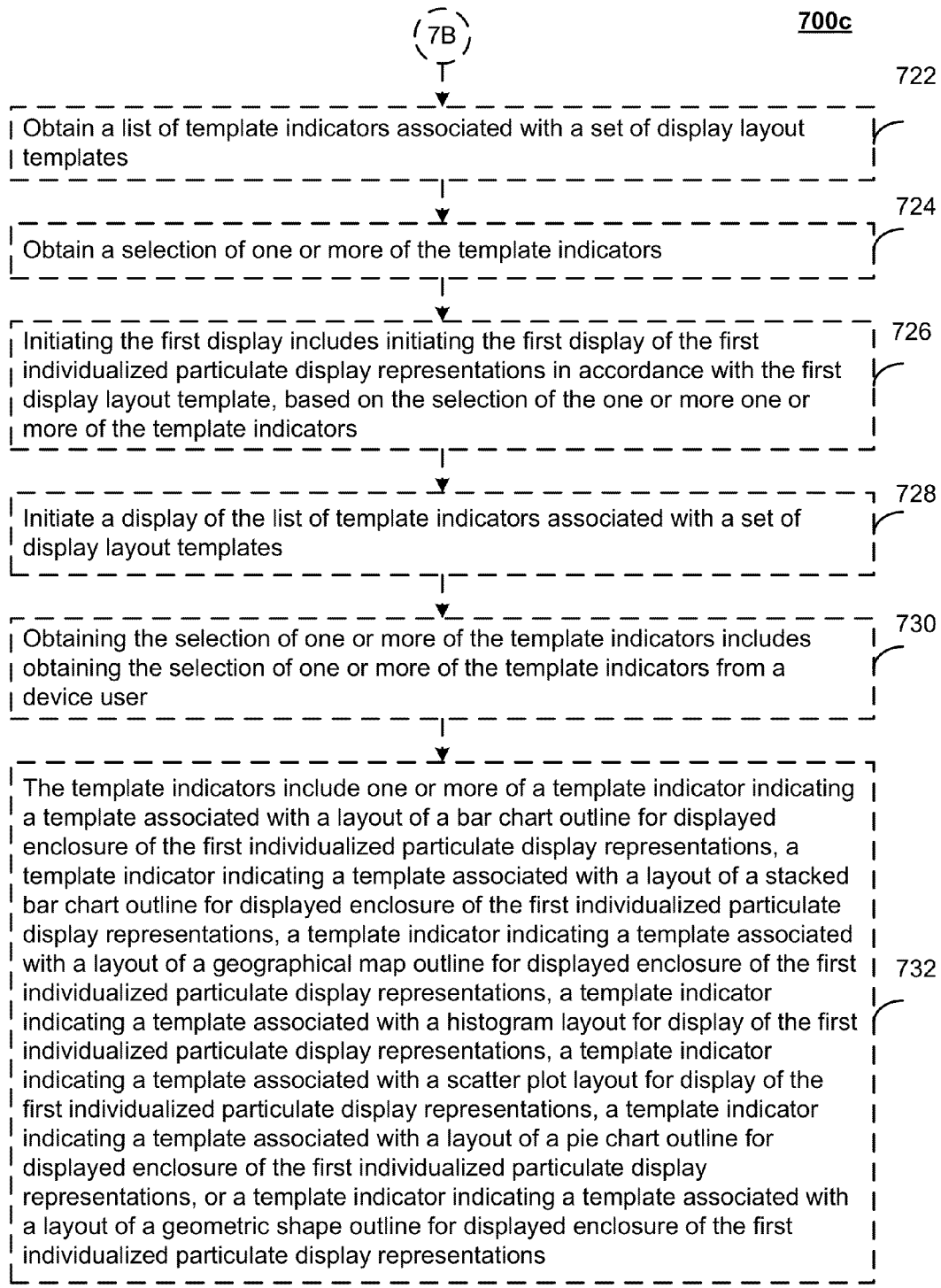

For example, a list of template indicators associated with a set of display layout templates may be obtained (722), in the example of FIG. 7c. For example, a selection of one or more of the template indicators may be obtained (724).

For example, initiating the first display may include initiating the first display of the first individualized particulate display representations in accordance with the first display layout template, based on the selection of the one or more one or more of the template indicators (726).

For example, a display of the list of template indicators associated with a set of display layout templates may be initiated (728).

For example, obtaining the selection of one or more of the template indicators may include obtaining the selection of one or more of the template indicators from a device user (730).

For example, the template indicators may include one or more of a template indicator indicating a template associated with a layout of a bar chart outline for displayed enclosure of the first individualized particulate display representations, a template indicator indicating a template associated with a layout of a stacked bar chart outline for displayed enclosure of the first individualized particulate display representations, a template indicator indicating a template associated with a layout of a geographical map outline for displayed enclosure of the first individualized particulate display representations, a template indicator indicating a template associated with a histogram layout for display of the first individualized particulate display representations, a template indicator indicating a template associated with a scatter plot layout for display of the first individualized particulate display representations, a template indicator indicating a template associated with a layout of a pie chart outline for displayed enclosure of the first individualized particulate display representations, or a template indicator indicating a template associated with a layout of a geometric shape outline for displayed enclosure of the first individualized particulate display representations (732).

Figure 7D:
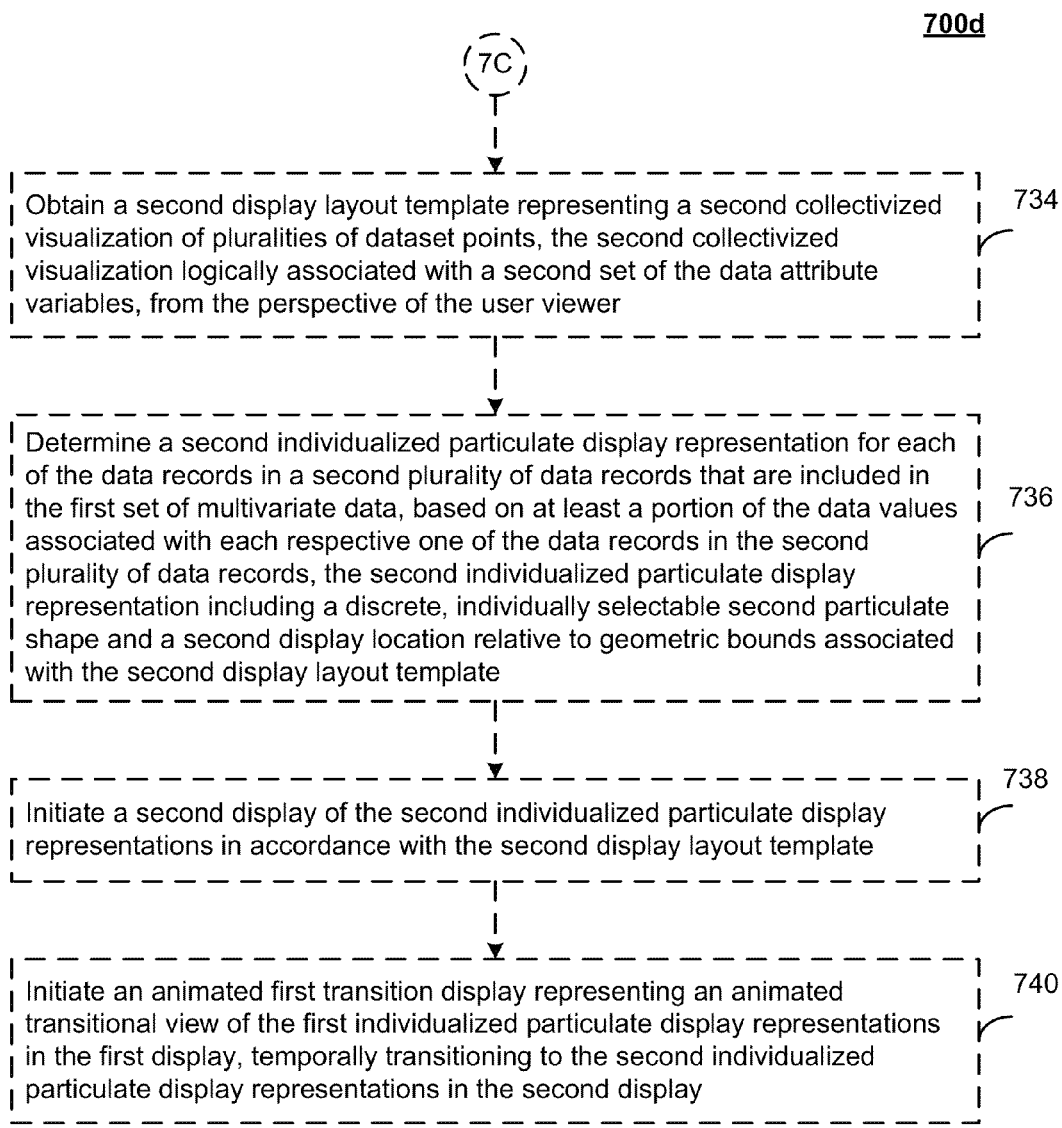

For example, a second display layout template representing a second collectivized visualization of pluralities of dataset points may be obtained, the second collectivized visualization logically associated with a second set of the data attribute variables, from the perspective of the user viewer (734), in the example of FIG. 7d.

For example, a second individualized particulate display representation may be determined for each of the data records in a second plurality of data records that are included in the set of multivariate data, based on at least a portion of the data values associated with each respective one of the data records in the second plurality of data records, the second individualized particulate display representation including a discrete, individually selectable second particulate shape and a second display location relative to geometric bounds associated with the second display layout template (736).

For example, a second display of the second individualized particulate display representations may be initiated, in accordance with the second display layout template (738).

For example, an animated first transition display representing an animated transitional view of the first individualized particulate display representations in the first display may be initiated, temporally transitioning to the second individualized particulate display representations in the second display (740).

For example, initiating the first display may include initiating the first display via graphical processing that is obtained based on a browser interfacing with one or more graphical processing units (GPUs) that are co-located on a user device.

For example, initiating the first display may include positioning the first individualized particulate display representations in accordance with the first individualized particulate display representations including selectable first individualized particulate display representations that are arranged in accordance with scatter plot arrangements within a bar chart arrangement. For example, such a display may include a displayed representation of the data records as a visualized simulation of "layered sand" particles in a bar chart, based on their respective relative positions in a scatterplot. For example, such a display may include a displayed representation of the data records as a visualized simulation of "layered sand" particles in a stacked bar chart (e.g., as "sand bars"), based on their respective relative positions in a scatterplot. Thus, for example, each individually displayed "sand particle" (i.e., each of the individual particulate display representations) comprising the bar chart may be individually selected for viewing of its attributes, or for further processing, as discussed herein.

Figure 8A:
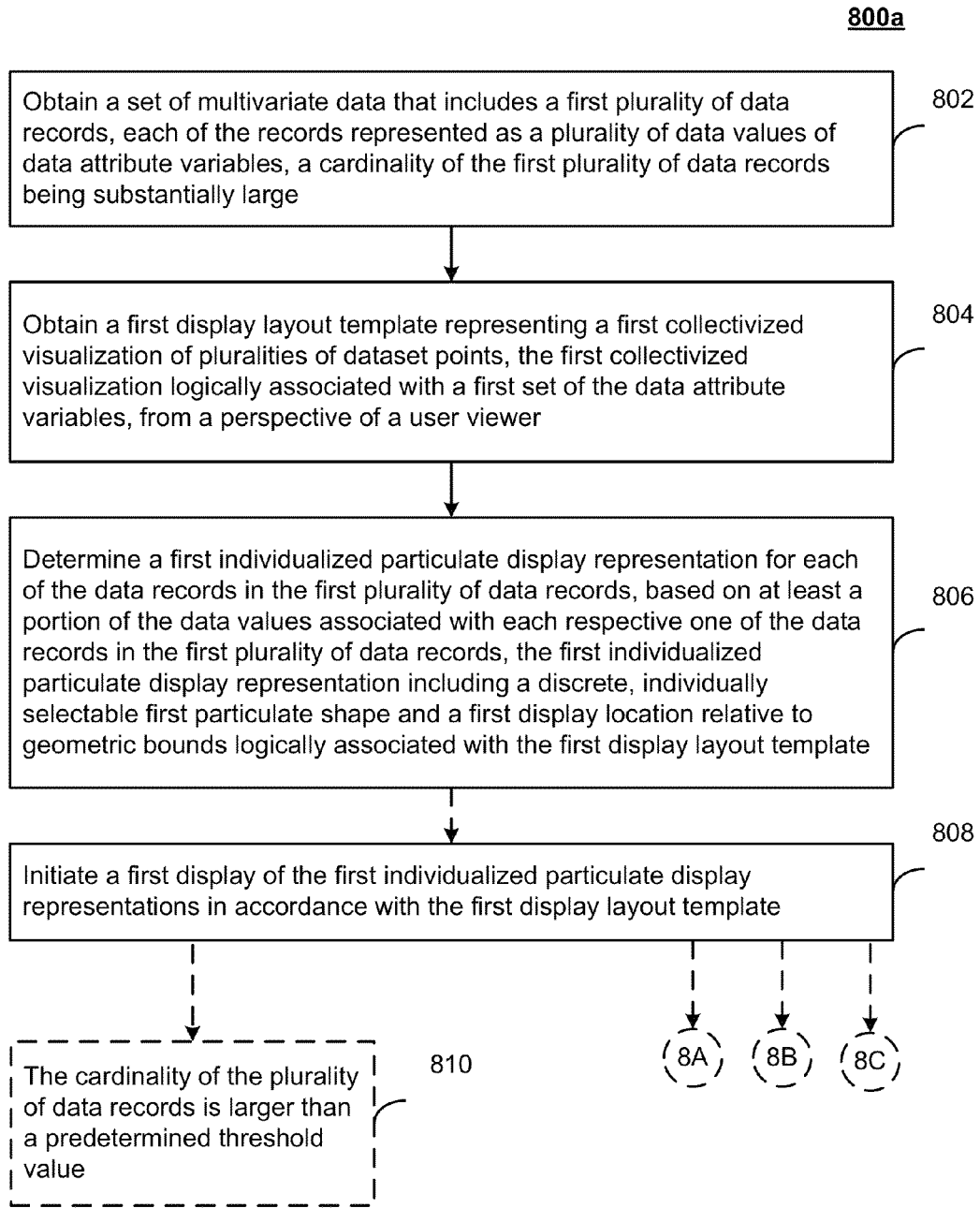

FIG. 8 is a flowchart illustrating example operations of the system of FIG. 1, according to example embodiments. In the example of FIG. 8a, a set of multivariate data that includes a first plurality of data records may be obtained (802). Each of the records may be represented as a plurality of data values of data attribute variables, a cardinality of the first plurality of data records being substantially large. For example, the dataset acquisition component 108 may obtain the set of multivariate data 110 that includes a first plurality of data records 112, each of the records represented as a plurality of data values of data attribute variables 114, a cardinality of the first plurality of data records 112 being substantially large, as discussed above.

A first display layout template representing a first collectivized visualization of pluralities of dataset points may be obtained, the first collectivized visualization logically associated with a first set of the data attribute variables, from a perspective of a user viewer (804). For example, the template acquisition component 134 may obtain a first display layout template 136 representing a first collectivized visualization of pluralities of dataset points, the first collectivized visualization logically associated with a first set of the data attribute variables 114, from a perspective of a user viewer, as discussed above.

A first individualized particulate display representation may be determined for each of the data records in the first plurality of data records, based on at least a portion of the data values associated with each respective one of the data records in the first plurality of data records, the first individualized particulate display representation including a discrete, individually selectable first particulate shape and a first display location relative to geometric bounds associated with the first display layout template (806). For example, the display representation determination component 138 may determine the first individualized particulate display representation 140 for each of the data records in the first plurality of data records 112, based on at least a portion of the data values associated with each respective one of the data records in the first plurality of data records 112, the first individualized particulate display representation 140 including a discrete, individually selectable first particulate shape 142 and a first display location 144 relative to geometric bounds associated with the first display layout template 136, as discussed above.

A first display of the first individualized particulate display representations may be initiated, in accordance with the first display layout template (808). For example, the display interface component 146 may initiate a first display of the first individualized particulate display representations 140 in accordance with the first display layout template 136, as discussed above.

For example, the cardinality of the plurality of data records may be larger than a predetermined threshold value (810).

For example, the first display layout template may include one or more of a template associated with a layout of a bar chart outline for displayed enclosure of the first individualized particulate display representations, a template associated with a layout of a stacked bar chart outline for displayed enclosure of the first individualized particulate display representations, a template associated with a layout of a geographical map outline for displayed enclosure of the first individualized particulate display representations, a template associated with a histogram layout for display of the first individualized particulate display representations, a template associated with a scatter plot layout for display of the first individualized particulate display representations, a template associated with a layout of a pie chart outline for displayed enclosure of the first individualized particulate display representations, or a template associated with a layout of a geometric shape outline for displayed enclosure of the first individualized particulate display representations (812), in the example of FIG. 8b.

For example, one or more display attributes associated with the first individualized particulate display representation may be determined, based on one or more of a selection of at least one of the display attributes obtained from a user, a determination at least one of the display attributes based on a function of one or more of the data attribute variables for the respective each data record, a selection of the respective each data record obtained from a user, or a selection of the respective each data record based on a change in value of one or more of the data attribute variables for the respective each data record (814).

Figure 8C:
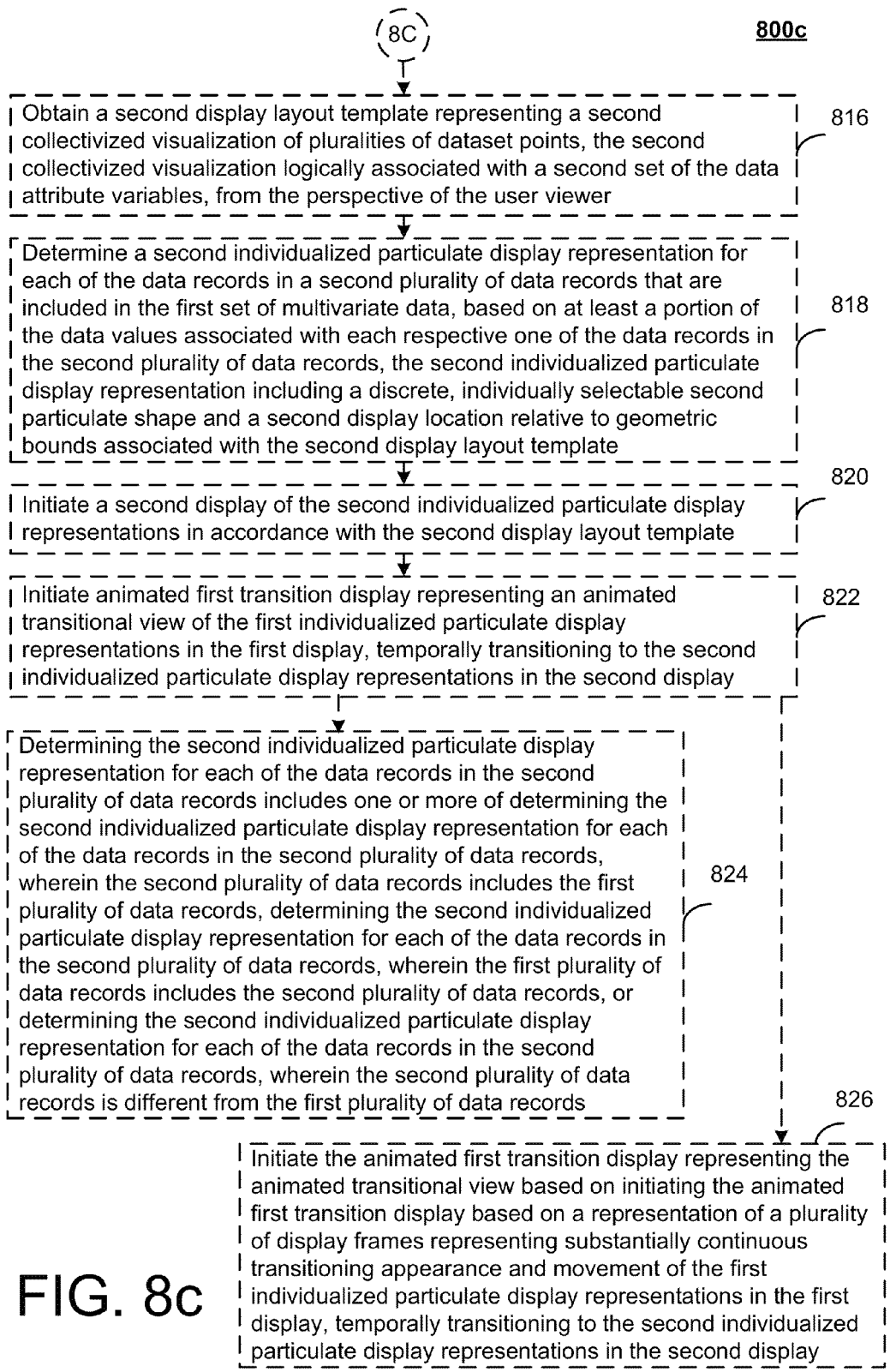

For example, a second display layout template representing a second collectivized visualization of pluralities of dataset points may be obtained, the second collectivized visualization logically associated with a second set of the data attribute variables, from the perspective of the user viewer (816), in the example of FIG. 8c.

For example, a second individualized particulate display representation may be determined for each of the data records in a second plurality of data records that are included in the set of multivariate data, based on at least a portion of the data values associated with each respective one of the data records in the second plurality of data records, the second individualized particulate display representation including a discrete, individually selectable second particulate shape and a second display location relative to geometric bounds associated with the second display layout template (818).

For example, a second display of the second individualized particulate display representations may be initiated, in accordance with the second display layout template (820).

For example, an animated first transition display representing an animated transitional view of the first individualized particulate display representations in the first display may be initiated, temporally transitioning to the second individualized particulate display representations in the second display (822).

For example, determining the second individualized particulate display representation for each of the data records in the second plurality of data records may include one or more of determining the second individualized particulate display representation for each of the data records in the second plurality of data records, wherein the second plurality of data records includes the first plurality of data records, determining the second individualized particulate display representation for each of the data records in the second plurality of data records, wherein the first plurality of data records includes the second plurality of data records, or determining the second individualized particulate display representation for each of the data records in the second plurality of data records, wherein the second plurality of data records is different from the first plurality of data records (824).

For example, the animated first transition display representing the animated transitional view may be initiated based on initiating the animated first transition display based on a representation of a plurality of display frames representing substantially continuous transitioning appearance and movement of the first individualized particulate display representations in the first display, temporally transitioning to the second individualized particulate display representations in the second display (826).

One skilled in the art of data processing will understand that there may be many ways of providing particle based visualizations, without departing from the spirit of the discussion herein.

Customer privacy and confidentiality have been ongoing considerations in data processing environments for many years. Thus, example techniques for providing particle based visualizations may use user input and/or data provided by users who have provided permission via one or more subscription agreements (e.g., "Terms of Service" (TOS) agreements) with associated applications or services associated with such analysis. For example, users may provide consent to have their input/data transmitted and stored on devices, though it may be explicitly indicated (e.g., via a user accepted agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    a device that includes at least one processor, the device including a particle based visualization engine comprising instructions tangibly embodied on a computer readable storage medium for execution by the at least one processor, the particle based visualization engine including:
        a dataset acquisition component configured to obtain a set of multivariate data that includes a first plurality of data records, each of the data records represented as a plurality of data values of data attribute variables, a cardinality of the first plurality of data records being substantially large;
        a template acquisition component configured to obtain a first display layout template representing a first collectivized visualization of pluralities of dataset points, the first collectivized visualization logically associated with a first set of the data attribute variables, from a perspective of a user viewer;
        a display representation determination component configured to determine a first individualized particulate display representation for each of the data records in the first plurality of data records, based on at least a portion of the data values associated with each respective one of the data records in the first plurality of data records, the first individualized particulate display representation including a discrete, individually selectable first particulate shape and a first display location relative to geometric bounds logically associated with the first display layout template;
        a display interface component configured to initiate a first display of the first individualized particulate display representations in accordance with the first display layout template; and
        an animated transition display interface component configured to initiate an animated first transition display representing an animated transitional view of the first individualized particulate display representations in the first display, temporally transitioning to a second display of second individualized particulate display representations, substantially preserving relative pairwise visual geometric positioning arrangements of pairs of the first individualized particulate display representations in the first display, in transitions to the corresponding second individualized particulate display representations in the second display, based on substantially avoiding visualized crossings of individualized particulate display representations.

2. The system of claim 1, further comprising:
    a selection display component configured to initiate a display of one or more selectable options to a device user, the selectable options including one or more of:
        a data filter of the data attribute variables,
        a data filter of values of one or more of the data attribute variables,
        a data filter of sources of the multivariate data,
        a template indicator indicating a template associated with a layout of a bar chart outline for displayed enclosure of the first individualized particulate display representations,
        a template indicator indicating a template associated with a layout of a stacked bar chart outline for displayed enclosure of the first individualized particulate display representations,
        a template indicator indicating a template associated with a layout of a geographical map outline for displayed enclosure of the first individualized particulate display representations,
        a template indicator indicating a template associated with a histogram layout for display of the first individualized particulate display representations,
        a template indicator indicating a template associated with a scatter plot layout for display of the first individualized particulate display representations, a template indicator indicating a template associated with a layout of a pie chart outline for displayed enclosure of the first individualized particulate display representations, a template indicator indicating a template associated with a layout of a geometric shape outline for displayed enclosure of the first individualized particulate display representations, a color selection associated with one or more of the data attribute variables, a geometric shape selection associated with one or more of the data attribute variables, a visualization opacity selection associated with one or more of the data attribute variables, a gamma function indicator indicating selectable skew attributes for association with selected display objects, a gradient indicator indicating selectable gradient values for association with one or more of the data attribute variables, or a transition indicator indicating transitional display attributes for the animated first transition display.

3. The system of claim 1, further comprising:

a particulate display representation arrangement component configured to determine an ordered display arrangement of the respective particulate shapes associated with respective ones of the data records, based on an arrangement function of one or more of the data attribute variables.

4. The system of claim 3, wherein:

the arrangement function of the one or more of the data attribute variables includes one or more of:

input logic obtained from a device user, or an arrangement function that is based on a mapping of at least a portion of the data attribute variables represented as points in k-dimensional space, to locations in a display space associated with a display device that is associated with the first display.

5. The system of claim 3, wherein:

the arrangement function of the one or more of the data attribute variables includes an arrangement function that is based on the substantially preserving the relative pairwise arrangements of pairs of the first individualized particulate display representations in the first display, in transitions to the corresponding second individualized particulate display representations in the second display, based on the substantially avoiding visualized crossings of individualized particulate display representations, wherein the relative pairwise arrangements include one or more of:

a relative arrangement of the pairs in a vertical direction in the first display, a relative arrangement of the pairs in a horizontal direction in the first display, a relative arrangement of the pairs in a separation distance aspect in the first display, or a relative arrangement of the pairs in a closeness aspect in the first display.

6. The system of claim 1, further comprising:

a selection acquisition component configured to obtain one or more selection indicators from a device user, the one or more selection indicators including one or more of:

a selection of a geometric area that is included in the first display, a selection of one or more selectable options, in response to a display of the one or more selectable options for selection by the device user, a selection of a hover display of one of the data records, based on a selection of a hover display of a corresponding one of the first individualized particulate display representations that is displayed in the first display, or a selection of one of the data records, based on a selection of a corresponding one of the first individualized particulate display representations that is displayed in the first display.

7. The system of claim 1, wherein:

the template acquisition component is configured to obtain a second display layout template representing a second collectivized visualization of pluralities of dataset points, the second collectivized visualization logically associated with a second set of the data attribute variables, from the perspective of the user viewer, the display representation determination component is configured to determine respective second individualized particulate display representations for each of the data records in a second plurality of data records that are included in the set of multivariate data, based on at least a portion of the data values associated with each respective one of the data records in the second plurality of data records, each of the second individualized particulate display representations including a discrete, individually selectable second particulate shape and a second display location relative to geometric bounds logically associated with the second display layout template, and the display interface component is configured to initiate the second display of the second individualized particulate display representations in accordance with the second display layout template.

8. The system of claim 1, wherein:

initiating the first display of the first individualized particulate display representations in accordance with the first display layout template includes initiating the first display based on positioning the first individualized particulate display representations in accordance with the first individualized particulate display representations including selectable first individualized particulate display representations that are arranged in accordance with scatter plot arrangements within a bar chart arrangement.

9. A method comprising:

obtaining a set of multivariate data that includes a first plurality of data records, each of the data records represented as a plurality of data values of data attribute variables, a cardinality of the first plurality of data records being substantially large;

obtaining, via a device processor, a first display layout template representing a first collectivized visualization of pluralities of dataset points, the first collectivized visualization logically associated with a first set of the data attribute variables, from a perspective of a user viewer;

determining a first individualized particulate display representation for each of the data records in the first plurality of data records, based on at least a portion of the data values associated with each respective one of the data records in the first plurality of data records, the first individualized particulate display representation including a discrete, individually selectable first particulate shape and a first display location relative to geometric bounds logically associated with the first display layout template; and initiating a first display of the first individualized particulate display representations in accordance with the first display layout template, based on positioning the first individualized particulate display representations that are arranged in accordance with scatter plot arrangements within a bar chart arrangement.

10. The method of claim 9, further comprising:
obtaining a list of data filters associated with the set of multivariate data; and
obtaining a selection of one or more of the data filters, wherein:
initiating the first display includes initiating the first display of the first individualized particulate display representations in accordance with the first display layout template, based on the selection of the one or more data filters.

11. The method of claim 10, further comprising:
initiating a display of the list of data filters associated with the set of multivariate data, wherein:
obtaining the selection of one or more of the data filters includes obtaining a selection of one or more of the data filters from a device user, wherein:
the data filters include one or more of:
a data filter of the data attribute variables,
a data filter of values of one or more of the data attribute variables, or
a data filter of sources of the multivariate data.

12. The method of claim 9, further comprising:
obtaining a list of template indicators associated with a set of display layout templates; and
obtaining a selection of one or more of the template indicators, wherein:
initiating the first display includes initiating the first display of the first individualized particulate display representations in accordance with the first display layout template, based on the selection of the one or more one or more of the template indicators.

13. The method of claim 9, further comprising:
obtaining a second display layout template representing a second collectivized visualization of pluralities of dataset points, the second collectivized visualization logically associated with a second set of the data attribute variables, from the perspective of the user viewer;
determining a second individualized particulate display representation for each of the data records in a second plurality of data records that are included in the set of multivariate data, based on at least a portion of the data values associated with each respective one of the data records in the second plurality of data records, the second individualized particulate display representation including a discrete, individually selectable second particulate shape and a second display location relative to geometric bounds logically associated with the second display layout template;
initiating a second display of the second individualized particulate display representations in accordance with the second display layout template; and
initiating an animated first transition display representing an animated transitional view of the first individualized particulate display representations in the first display, temporally transitioning to the second individualized particulate display representations in the second display.

14. The method of claim 9, wherein:
initiating the first display of the first individualized particulate display representations in accordance with the first display layout template includes initiating the first display via graphical processing that is obtained based on a browser interfacing with one or more graphical processing units (GPUs) that are co-located on a user device.

15. A computer program product tangibly embodied on a computer-readable storage medium and including executable code that causes at least one data processing apparatus to:
obtain a set of multivariate data that includes a first plurality of data records, each of the data records represented as a plurality of data values of data attribute variables, a cardinality of the first plurality of data records being substantially large;
obtain a first display layout template representing a first collectivized visualization of pluralities of dataset points, the first collectivized visualization logically associated with a first set of the data attribute variables, from a perspective of a user viewer;
determine a first individualized particulate display representation for each of the data records in the first plurality of data records, based on at least a portion of the data values associated with each respective one of the data records in the first plurality of data records, the first individualized particulate display representation including a discrete, individually selectable first particulate shape and a first display location relative to geometric bounds logically associated with the first display layout template; and
initiate a first display of the first individualized particulate display representations in accordance with the first display layout template, based on positioning the first individualized particulate display representations that are arranged in accordance with scatter plot arrangements within a bar chart arrangement.

16. The computer program product of claim 15, wherein:
the cardinality of the plurality of data records is larger than a predetermined threshold value.

17. The computer program product of claim 15, wherein the executable code is configured to cause the at least one data processing apparatus to:
determine one or more display attributes associated with the first individualized particulate display representation, based on one or more of:
a selection of at least one of the display attributes obtained from a user,
a determination at least one of the display attributes based on a function of one or more of the data attribute variables for the respective each data record,
a selection of the respective each data record obtained from a user, or
a selection of the respective each data record based on a change in value of one or more of the data attribute variables for the respective each data record.

18. The computer program product of claim 15, wherein the executable code is configured to cause the at least one data processing apparatus to:
obtain a second display layout template representing a second collectivized visualization of pluralities of dataset points, the second collectivized visualization logically associated with a second set of the data attribute variables, from the perspective of the user viewer;
determine a second individualized particulate display representation for each of the data records in a second plurality of data records that are included in the set of multivariate data, based on at least a portion of the data values associated with each respective one of the data records in the second plurality of data records, the second individualized particulate display representation including a discrete, individually selectable second particulate shape and a second display location relative to geometric bounds logically associated with the second display layout template;

initiate a second display of the second individualized particulate display representations in accordance with the second display layout template; and initiate an animated first transition display representing an animated transitional view of the first individualized particulate display representations in the first display, temporally transitioning to the second individualized particulate display representations in the second display.

19. The computer program product of claim 18, wherein:

determining the second individualized particulate display representation for each of the data records in the second plurality of data records includes one or more of:

determining the second individualized particulate display representation for each of the data records in the second plurality of data records, wherein the second plurality of data records includes the first plurality of data records, determining the second individualized particulate display representation for each of the data records in the second plurality of data records, wherein the first plurality of data records includes the second plurality of data records, or determining the second individualized particulate display representation for each of the data records in the second plurality of data records, wherein the second plurality of data records is different from the first plurality of data records.

20. The computer program product of claim 18, wherein the executable code is configured to cause the at least one data processing apparatus to:

initiate the animated first transition display representing the animated transitional view based on initiating the animated first transition display based on a representation of a plurality of display frames representing substantially continuous transitioning appearance and movement of the first individualized particulate display representations in the first display, temporally transitioning to the second individualized particulate display representations in the second display.

* * * * *